United States Patent [19]

Back

[11] Patent Number: 4,680,385
[45] Date of Patent: Jul. 14, 1987

[54] METAL DYE COMPLEXES CONTAINING AN AZO OR AZOMETHINE DYE AND A COLORLESS LIGAND WITH THE C=N—N=C GROUP

[75] Inventor: Gerhard Back, Lörrach, Fed. Rep. of Germany

[73] Assignee: Ciba-Geigy Corporation, Ardsley, N.Y.

[21] Appl. No.: 717,733

[22] Filed: Mar. 28, 1985

[30] Foreign Application Priority Data

Apr. 6, 1984 [CH] Switzerland .................. 1751/84

[51] Int. Cl.⁴ .................. C09B 45/06; C09B 45/16; D06P 1/10; D06P 3/24
[52] U.S. Cl. .................. 534/695; 534/619; 534/629; 534/699; 534/738; 556/34; 564/149; 564/151
[58] Field of Search .......... 534/695, 699, 738, 619, 534/629; 556/34

[56] References Cited

U.S. PATENT DOCUMENTS

| | | | |
|---|---|---|---|
| 3,682,995 | 8/1972 | Ogden | 260/438.1 |
| 4,256,633 | 3/1981 | Beffa | 534/695 X |
| 4,544,739 | 10/1985 | Schutz et al. | 534/695 X |
| 4,563,193 | 1/1986 | Beffa | 534/695 X |

FOREIGN PATENT DOCUMENTS

| | | | |
|---|---|---|---|
| 0068242 | 1/1983 | European Pat. Off. | 534/695 |
| 0088729 | 9/1983 | European Pat. Off. | 534/695 |
| 91817 | 3/1896 | Fed. Rep. of Germany | 534/738 |
| 1016964 | 1/1966 | United Kingdom | 534/738 |
| 1134348 | 11/1968 | United Kingdom | 260/438.1 |
| 1512679 | 6/1978 | United Kingdom | 534/695 |

*Primary Examiner*—Floyd D. Higel
*Attorney, Agent, or Firm*—Edward McC. Roberts; Meredith C. Findlay

[57] ABSTRACT

Metal complex dyes that produce level, fast dyeings on textile materials are provided according to the formula

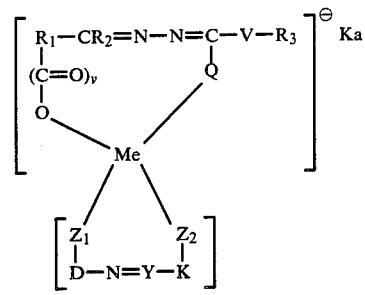

wherein:
D is a benzene, naphthalene or heterocyclic radical of a diazo component;
Y is nitrogen or —CH;
K is the radical of a coupling component if Y is nitrogen, or an o-hydroxyaldehyde radical if Y is —CH;
Ka is a cation;
Me is chromium or cobalt;
$Z_1$ is —O— or —COO— ortho to N=Y
$Z_2$ is —O— or —NR vicinal to N=Y, wherein R is hydrogen or a $C_1$-$C_4$ alkyl or phenyl radical;
$R_1$ is a direct bond or a $C_1$-$C_8$-alkyl, $C_1$-$C_8$-alkenyl, or aryl radical or heterocyclic radial containing 1 to 3 sulfur, oxygen or nitrogen atoms;
$R_2$ is hydrogen or $C_1$-$C_8$-alkyl or aryl radical;
$R_3$ is hydrogen or a $C_1$-$C_8$ alkyl, aryl or amino radical, or a heterocyclic radical containing 1 to 3 sulfur, oxygen or nitrogen atoms;
V is a direct bond or oxygen;
Q is oxygen or sulfur; and
w is 0 or 1.

10 Claims, No Drawings

METAL DYE COMPLEXES CONTAINING AN AZO OR AZOMETHINE DYE AND A COLORLESS LIGAND WITH THE C=N—N=C GROUP

Metal complex dyes have long been known in the art and are widely used for dyeing and printing textiles made from fibre materials in a very wide range of shades. In view of the increasingly more stringent demands made of these dyes, for example with respect to levelness of dyeings and fastness properties, the dyes of the prior art are often not entirely satisfactory. Thus many of the known 1:2 metal complex azo or azomethine dyes do not satisfy current requirements regarding levelness because of poor diffusibility of the dyes in the fibre. Most of the known 1:1 metal complex azo or azomethine dyes suffer from the drawback that they have to be dyed from very acid baths in which some fabrics may be damaged. Metal complex dyes containing a chromophoric ligand and a colourless to substantially colourless ligand, which dyes have better diffusibility in the fibre, are already known in the art. However, many of these dyes do not meet the requirements in respect of stability of the complexes.

It is the object of the present invention to provide novel metal complex azo or azomethine dyes that give level dyeings of good allround fastness properties and are readily obtained and simple to apply, and which, in particular, have the excellent stability of 1:2 metal complex azo or azomethine dyes. It has been found that the novel chromium or cobalt complex dyes defined below meet these requirements.

Accordingly, the present invention relates to chromium or cobalt complex dyes of the formula

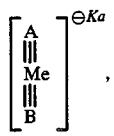  (1)

wherein A is the radical of a bicyclic metallisable azo or azomethine dye, B is the radical of a tridentate, dianionic complexing organic compound that contains a >C=N—N=C<— group which participates in the chromium or cobalt complex, Me is a chromium or cobalt atom and Ka is a cation.

The chromium or cobalt complexes of the formula (1) are anionic. The radical B therefore participates in the chromium or cobalt complex as radical of a tridentate, complexable organic compound having two covalent bonds and one co-ordinative bond.

The definition of B as radical of a dianionic compound means that the compound affording the radical B contains two metallisable groups which, for example by removal of a hydrogen atom in —OH, —COOH or —SH— groups, are able to react with the metal atom to form covalent bonds.

Aside from the complexing groups, the radical A in formula (1) of an azo or azomethine dye can carry the customary substituents of dyes, for example $C_1$–$C_4$alkyl groups such as methyl, ethyl, propyl, isopropyl and butyl, $C_1$–$C_4$alkoxy groups such as methoxy, ethoxy, propoxy, isopropoxy and butoxy, $C_1$–$C_6$acylamino groups such as acetylamino and propionylamino, benzoylamino, amino, $C_1$–$C_4$monoalkylamino or $C_1$–$C_4$dialkylamino, phenylamino; $C_1$–$C_4$alkoxycarbonyl, nitro, cyano, trifluoromethyl, halogen such as fluorine, chlorine and bromine, sulfamoyl, carbamoyl, ureido, hydroxy, $C_1$–$C_4$alkylsulfonyl, for example methylsulfonyl; carboxy, sulfomethyl and sulfo, as well as arylazo groups such as phenylazo and naphthylazo. The radical A of an azo or azomethine dye is in particular the radical of the formula

  (2)

wherein D is the radical of a diazo component of the benzene, naphthalene or heterocyclic series, Y is a nitrogen atom or the —CH— group, K, if Y is a nitrogen atom, is the radical of a coupling component, preferably of the benzene, naphthalene or heterocyclic series, or of a ketomethylene compound or, if Y is the —CH— group, is the radical of an o-hydroxyaldehyde, $Z_1$ in the ortho-position to the azo or azomethine group is the —O— or —COO— group, and $Z_2$ is the —O— or —N(R) group, where R is hydrogen, unsubstituted or substituted $C_1$–$C_4$alkyl or unsubstituted or substituted phenyl, and $Z_2$ vicinal to the —N=Y— radical is bonded to K.

Of the host of possible tridentate, dianionic, complexable organic compounds that contain the radical B, those colourless to substantially colourless acylhydrazones, semicarbazones and thiosemicarbazones are particularly suitable which are able to form two 5-, 6- or 7-membered rings with the chromium or cobalt atom, preferably two 5- or 6-membered rings and, most preferably, one 5-membered and one 6-membered ring. Surprisingly, the chromium or cobalt complexes of formula (1), wherein B forms a 5-membered and a 6-membered ring with the chromium or cobalt atom, have very great stability.

Particularly preferred compounds are those wherein B is the radical of the formula

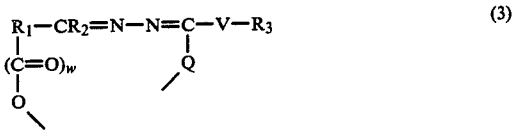  (3)

wherein $R_1$ is a direct bond or an unsubstituted or substituted alkyl, alkenyl or aryl radial or is a heterocyclic radical, $R_2$ is hydrogen or an unsubstituted or substituted alkyl or aryl radical, V is a direct bond or an oxygen atom, $R_3$ is hydrogen, an unsubstituted or substituted alkyl or aryl radical, a heterocyclic radical or an unsubstituted or substituted amino group, Q is an oxygen or sulfur atom, and w is 0 or 1.

If $R_1$ is a direct bond, then w is preferably 1.

$R_1$ as an unsubstituted or substituted alkyl radical is preferably a $C_1$–$C_8$alkyl radical, preferably a $C_1$–$C_4$alkyl radical, which may be substituted by halogen such as fluorine, chlorine or bromine, $C_1$–$C_4$alkoxy such as methoxy or ethoxy, aryl such as phenyl or naphthyl, carboxyl, $C_1$–$C_8$alkoxycarbonyl such as methoxycarbonyl or ethoxycarbonyl, phenoxycarbonyl, $C_1$–$C_8$alkylaminocarbonyl such as methylaminocarbonyl or ethylaminocarbonyl, phenylaminocarbonyl, and phenylamino.

$R_1$ as an unsubstituted or substituted alkenyl radical is in particular a $C_1$–$C_8$alkenyl radical, preferably a $C_1$–$C_-$ 4alkenyl radical, which may be substituted as indicated above for the alkyl radical $R_1$.

$R_1$ as an unsubstituted or substituted aryl radical is in particular a phenyl or naphthyl radical which may be substituted by $C_1$–$C_4$alkyl such as methyl, ethyl, propyl, isopropyl, butyl, isobutyl, sec-butyl and tert-butyl, $C_1$–$C_4$alkoxy such as methoxy, ethoxy, propoxy, isopropoxy, butoxy, isobutoxy sec-butoxy and tert-butoxy, halogen such as fluorine, chlorine, and bromine, $C_2$–$C_5$alkanoylamino such as acetylamino, propionylamino and butyrylamino, nitro, hydroxy, cyano, sulfo, arylazo groups such as phenylazo or naphthylazo groups which may be further substituted in the phenyl or naphthyl ring by the indicated substituents.

If $R_1$ is an alkyl, alkenyl or aryl radical, then the —(C=O)$_w$—O— radical is linked to the —C($R_2$) radical preferably through an α- or β-carbon atom.

$R_2$ as an unsubstituted or substituted alkyl radical is preferably a $C_1$–$C_8$alkyl radical, most preferably a $C_1$–$C_4$alkyl radical, which may be further substituted as indicated above for the alkyl radical $R_1$.

$R_2$ as an unsubstituted or substituted aryl radical is preferably a phenyl or naphthyl radical which can be further substituted as indicated above for the aryl radical $R_1$.

$R_3$ as an unsubstituted or substituted alkyl or aryl radical may be an alkyl or aryl radical of the same type as indicated above for $R_1$.

$R_1$ and $R_3$ as a heterocyclic radical are each independently an aliphatic or aromatic heterocyclic radical which contains 1 to 3 hetero atoms such as sulfur, oxygen or nitrogen. Examples of such radicals are: piperidinyl, pyrrolidinyl, morpholinyl, pyrimidinyl, pyridyl, quinolinyl and isoquinolinyl, all of which radicals may be further substituted as indicated for example for the aryl radical $R_1$.

$R_3$ as an unsubstituted or substituted amino group may be —$NH_2$, —$N(H)$—$C_1$–$C_8$alkyl, —$N(C_1$–$C_8$alkyl$)_2$, phenylamino or N—$C_1$–$C_8$alkyl-N-phenylamino, where the phenyl moiety may be substituted as indicated for the phenyl radical $R_1$.

Particularly preferred are the radicals B of the formula (3), wherein at least one of $R_1$ and $R_3$ is an aryl radical.

Also preferred are the radicals B of the formula (3), wherein V is a direct bond and/or Q is an oxygen atom.

The most preferred radicals B are the radicals of the formula (3), wherein $R_1$ is phenyl or naphthyl, each unsubstituted or substituted by $C_1$–$C_4$alkyl, halogen, nitro, acetylamino, sulfo, phenylazo or sulfophenylazo, or is pyridyl or quinolinyl, each substituted by hydroxy and, optionally, by $C_1$–$C_4$alkyl, $R_2$ is hydrogen or $C_1$–$C_4$alkyl, V is a direct bond or an oxygen atom, w is 0, Q is an oxygen or sulfur atom, and $R_3$ is hydrogen, amino, $C_1$–$C_4$alkyl, or phenyl which is unsubstituted or substituted by $C_1$–$C_4$alkyl, halogen, hydroxy or nitro, or wherein $R_1$ is a direct bond, $R_2$ is hydrogen, $C_1$–$C_4$alkyl or phenyl, V is a direct bond or an oxygen atom, w is 1, Q is an oxygen atom and $R_3$ is hydrogen, amino, $C_1$–$C_4$alkyl or phenyl which is unsubstituted or substituted by $C_1$–$C_4$alkyl, hydroxy, halogen or nitro, or wherein $R_1$ is unsubstituted or carboxy-substituted $C_1$–$C_4$alkyl, $R_2$ is hydrogen or unsubstituted or carboxy-substituted $C_1$–$C_4$alkyl, V is a direct bond or an oxygen atom, w is 0 or 1, Q is an oxygen atom, and $R_3$ is hydrogen, amino, $C_1$–$C_3$alkyl, or phenyl which is unsubstituted or substituted by $C_1$–$C_4$alkyl, hydroxy, halogen or nitro, or wherein $R_1$ is $C_2$–$C_6$alkenyl which is unsubstituted or substituted by phenyl or phenylamino, $R_2$ and $R_3$ are each independently hydrogen, $C_1$–$C_4$alkyl, or phenyl which is unsubstituted or substituted by $C_1$–$C_4$alkyl, halogen, hydroxy or nitro, or $R_3$ is amino, V is a direct bond or an oxygen atom, w is 0, and Q is an oxygen atom.

The preferred radicals B have the formulae

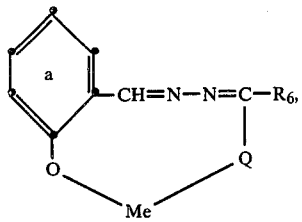

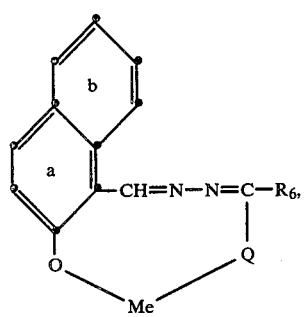

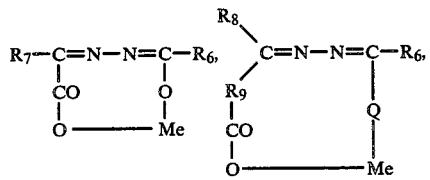

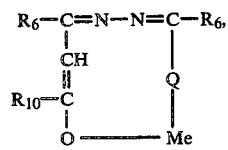

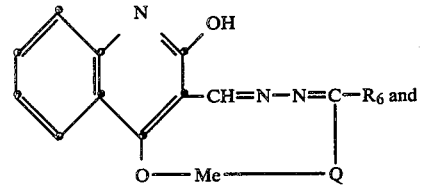

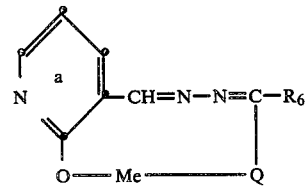

wherein $R_6$ is hydrogen, $C_1$–$C_4$alkyl, $C_1$–$C_4$alkoxy, amino or a phenyl or phenoxy radical, each unsubstituted or substituted by $C_1$–$C_4$alkyl, halogen, hydroxy or nitro, $R_7$ is hydrogen, $C_1$–$C_4$alkyl or phenyl, $R_8$ is hydrogen or unsubstituted or carboxy-substituted $C_1$–$C_4$alkyl, $R_9$ is $C_1$–$C_2$alkyl, and $R_{10}$ is $C_1$–$C_4$alkyl, and the ring (a) and/or (b) may be substituted by $C_1$–$C_4$alkyl, halogen, nitro, acetylamino hydroxy, sulfo, phenylazo or sulfophenylazo.

The metal atom has been inserted into the above formulae in order to illustrate the mode of attachment of the radical B to the metal atom.

The cation Ka in formula (1) denotes a hydrogen, sodium, potassium, lithium or ammonium ion or the cation of an organic amine, for example of triethanolamine.

Preferred chromium or cobalt complexes of the formula (1) are those wherein the radicals A and/or B contain at least one water-solubilising group. Suitable water-solubilising groups are: sulfone, sulfonamido, N-monoalkylsulfonamido or N,N-dialkylsulfonamido groups as well as sulfonic acid groups. The radical of formula (2) preferably contains 0, 1, 2, 3 or 4 sulfonic acid groups.

Suitable sulfone groups are alkylsulfone groups, preferably $C_1-C_4$alkylsulfone groups.

A particularly suitable N-monoalkylsulfone or N,N-dialkylsulfone group is one containing one or two $C_1-C_4$alkyl groups.

The preferred chromium or cobalt complexes have the formula

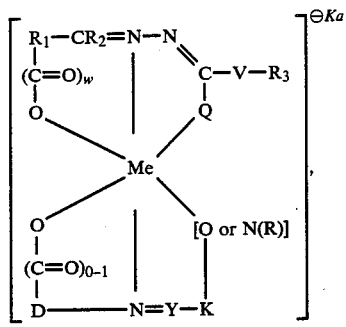

(4)

wherein $R_1$ is the direct bond to the —COO radical, an unsubstituted or carboxy-substituted $C_1-C_8$alkyl radical, preferably an unsubstituted or carboxy-substituted $C_1-C_4$alkyl radical, a $C_1-C_8$alkenyl radical, preferably a $C_1-C_4$alkenyl radical, which is unsubstituted or substituted by phenyl or phenylamino, a phenyl or naphthyl radical, each unsubstituted or substituted by $C_1-C_4$alkyl, halogen, nitro, $C_2-C_4$alkanoylamino, sulfo, carboxy or arylazo, preferably phenylazo, or is a pyridyl or quinolinyl radical, each substituted by hydroxy and, optionally, by $C_1-C_4$alkyl, $R_2$ is hydrogen, an unsubstituted or carboxy-substituted $C_1-C_8$alkyl or, preferably, $C_1-C_4$alkyl radical, or is a phenyl or naphthyl radical, each unsubstituted or substituted by $C_1-C_4$alkyl, halogen, nitro, $C_2-C_4$alkanoylamino, sulfo or carboxy, V is a direct bond or an oxygen atom, $R_3$ is hydrogen, $C_1-C_8$alkyl, preferably $C_1-C_4$alkyl, $C_1-C_4$phenylalkyl, $C_1-C_4$naphthylalkyl, phenyl which is unsubstituted or substituted by halogen, hydroxy or nitro, or is a radical of the formula

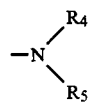

wherein $R_4$ and $R_5$ are each independently of the other hydrogen, unsubstituted or substituted $C_1-C_8$alkyl, preferably $C_1-C_4$alkyl, or unsubstituted or substituted phenyl, Q is an oxygen or a sulfur atom, w is 0 or 1, Me is a chromium or cobalt atom, D is the radical of a diazo component of the benzene or naphthalene series containing the —(CO)$_{0-1}$O— group in ortho-position to —N═Y—, Y is a nitrogen atom or the —CH— group, K, if Y is a nitrogen atom, is the radical of a coupling component of the benzene or naphthalene series or of the 5-pyrazolone, 5-aminopyrazole, hydroxyquinoline, acetoacetarylide or benzoylacetarylide series, which radical contains the —[O or N(R)]— radical in the vicinal position to the azo group, and R is hydrogen, unsubstituted or substituted $C_1-C_4$alkyl or unsubstituted or substituted phenyl or, if Y is the —CH— group, K is the radical of an o-hydroxybenzhaldehyde or o-hydroxynaphthaldehyde, and Ka is a cation.

In particular, in formula (4) $R_1$ is phenyl or naphthyl, each unsubstituted or substituted by $C_1-C_4$alkyl, halogen, nitro, acetylamino, sulfo, phenylazo or sulfophenylazo, or is pyridyl or quinolinyl, each substituted by hydroxy and, optionally, by $C_1-C_4$alkyl, $R_2$ is hydrogen or $C_1-C_4$alkyl, V is a direct bond or an oxygen atom, w is 0, Q is an oxygen or sulfur atom, and $R_3$ is hydrogen, amino, $C_1-C_4$alkyl, or phenyl which is unsubstituted or substituted by $C_1-C_4$alkyl, halogen, hydroxy or nitro, or $R_1$ is a direct bond, $R_2$ is hydrogen, $C_1-C_4$alkyl or phenyl, V is a direct bond or an oxygen atom, w is 1, Q is an oxygen atom, and $R_3$ is hydrogen, amino, $C_1-C_4$alkyl, or phenyl which is unsubstituted or substituted by $C_1-C_4$alkyl, hydroxy, halogen or nitro, or $R_1$ is unsubstituted or carboxy-substituted $C_1-C_4$alkyl, $R_2$ is hydrogen or unsubstituted or carboxy-substituted $C_1-C_4$alkyl, V is a direct bond or an oxygen atom, w is 0 or 1, Q is an oxygen atom, and $R_3$ is hydrogen, amino, $C_1-C_4$alkyl, or phenyl which is unsubstituted or substituted by $C_1-C_4$alkyl, hydroxy, halogen or nitro, or $R_1$ is $C_2-C_6$alkenyl which is unsubstituted or substituted by phenyl or phenylamino, $R_2$ and $R_3$ are each independently of the other hydrogen, $C_1-C_4$alkyl, or phenyl which is unsubstituted or substituted by $C_1-C_4$alkyl, halogen, hydroxy or nitro, or $R_3$ is amino, V is a direct bond or an oxygen atom, and w is 0 and Q is an oxygen atom.

Particularly preferred chromium or cobalt complexes are those of the formula

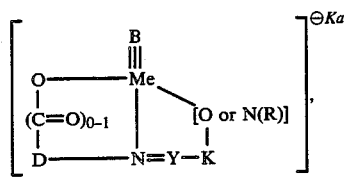

(5)

wherein B is the radical of the formula

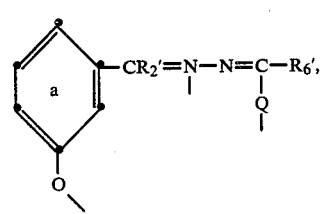

(6)

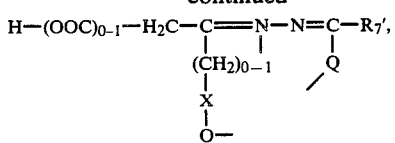  (7)

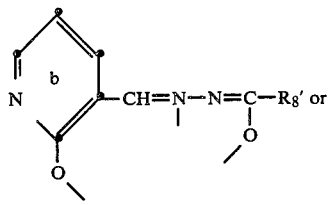  (8)

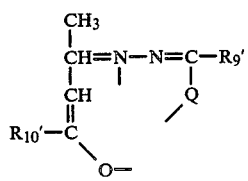  (9)

wherein $R_2'$ is hydrogen or methyl, $R_6'$ is hydrogen, methyl, ethoxy, ethyl, —NH$_2$, phenyl or phenyl which is substituted by chlorine, nitro or hydroxy, $R_7'$ is amino, methyl or phenyl, $R_8'$ is hydrogen or amino, $R_9'$ is amino, methyl or phenyl, $R_{10}'$ is methyl, phenyl or phenylamino, Q is an oxygen or sulfur atom, X is carbonyl or isopropyl, and the phenyl ring (a) in formula (6) can be substituted by chlorine, sulfo, phenylazo or sulfophenylazo or by a fused benzene ring, and wherein the pyridyl ring (b) can be substituted by hydroxy, methyl and a fused benzene ring, and D is a benzene nucleus which contains the —(C=O)$_{0-1}$O— group ortho to the —N=Y— group and can be substituted by sulfo, sulfamoyl, chlorine, nitro and methoxy groups, or is a naphthalene nucleus which contains the —(C=O)$_{0-1}$O group ortho to the —N=Y— group and can be substituted by sulfo and nitro, Y is a nitrogen atom or the —CH— group, K, if Y is a nitrogen atom, is a naphthalene nucleus which contains the [—O— or —N(-R)—] group ortho to the azo group and can be substituted by sulfo, N-methylsulfamoyl, acetylamino, methoxycarbonylamino and chlorine, a 1-phenyl-3-methyl-5-pyrazolone radical which can be substituted in the phenyl ring by chlorine and sulfo, a dimethylphenyl radical, a 2-hydroxyquinolinyl radical or an acetoacetanilide radical, which last three mentioned radicals are attached to the metal atom Me through an oxygen atom ortho to the azo group, R is hydrogen or phenyl or, if Y is the —CH— group, K is the radical of 2-hydroxybenzaldehyde, Ka is an alkali metal cation and Me is a chromium or cobalt atom.

Y in formulae (2), (4) and (5) is preferably the nitrogen atom. Me in formulae (1), (4) and (5) is preferably the chromium atom.

The chromium or cobalt complexes of formulae (1), (4) and (5) preferably contain one or two sulfonic acid groups.

The chromium or cobalt complexes of the formula (5) wherein B is the radical of the formula (6), are also preferred.

Most particularly preferred are the chromium complexes of formula (5), wherein K is a naphthalene nucleus which is attached to the chromium atom through an oxygen atom, Y is a nitrogen atom and the naphthalene nucleus can be substituted by the substituents indicated for formula (5).

The present invention further relates to a process for the preparation of chromium complexes of the formula (1), which process comprises reacting a compound which introduces the radical B, or precursors thereof, with a 1:1 complex of the formula

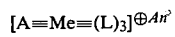  (10), wherein A and Me are as defined for formula (1), An is an anion and L is a colourless ligand which may stabilise the 1:1 complex, in aqueous, organic or aqueous-organic medium.

The compound which introduces the radical B is preferably reacted with the 1:1 chromium or cobalt complex of the formula (10) in the temperature range from 50° to 100° C. and in the pH range from 5 to 9.

Many metallisable azo and azomethine dyes which are able to donate the radical A are known from the literature. Examples of such dyes are o,o'-dihydroxyazo, o-carboxy-o'-hydroxyazo, o-hydroxy-o-aminoazo or -azomethine compounds, in particular of the formula

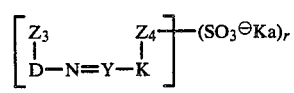  (11)

wherein $Z_3$ is the hydroxyl, carboxyl or methoxy group, $Z_4$ is the hydroxyl or —HN(R) group, and D, K, Y, Ka and R are as defined for formula (2), and r is 0, 1, 2, 3 or 4. The compounds of formula (11), wherein Y is a nitrogen atom, are prepared in a manner known per se by diazotising an amine of formula

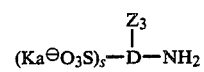  (12)

and coupling the diazonium salt to a coupling component of the formula

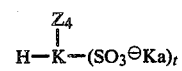  (13)

wherein D, K, $Z_3$, $Z_4$ and Ka are as defined for formula (11) and the sum of s+t is r.

The diazotisation of the diazo component of the formula (12) is normally effected by treatment with nitrous acid in an aqueous solution of mineral acid at low temperature, and the coupling to the coupling component of the formula (13) is carried out in the acid, neutral or alkaline pH range.

Examples of suitable amines of formula (12) are: 2-amino-1-hydroxybenzene, 2-amino-1-methoxybenzene, anthranilic acid, 4- or 5-sulfonamidoanthranilic acid, 3- or 5-chloroanthranilic acid, 4-chloro- and 4,6-dichloro-2-amino-1-hydroxybenzene, 4- or 5- or 6-nitro-2-amino-1-hydroxybenzene, 4-chloro- and 4-methyl- and 4-acetylamino-6-nitro-2-amino-1-hydroxybenzene, 6-acetylamino- and 6-chloro-4-nitro-2-amino-1-hydroxybenzene, 4-cyano-2-amino-1-hydroxybenzene, 4-methoxy-2-amino-1-hydroxybenzene, 2-amino-1-hydroxybenzene-5-methyl- and -5-benzylsulfone, 2-amino-1-hydroxybenzene-4-methyl-, -ethyl-, -chloromethyl- and -butylsulfone, 6-chloro-, 5-nitro- and 6-nitro-2-amino-1-hydroxybenzene-4-methylsulfone, 2-amino-1-hydroxybenzene-4- or -5-sulfamide, 2-amino-1-hydroxybenzene-4- or -5-sulf-N-methylamide and 2-amino-1-hydroxybenzene-4- or -5-sulf-N-$\beta$-hydroxyethylamide, 2-amino-1-methoxybenzene-4-sulfanilide, 4-methoxy-5-chloro-2-amino-1-hydroxybenzene, 4-methyl-2-amino-1-hydroxybenzene, 4-chloro-5-nitro-2-amino-1-hydroxybenzene, 5-nitro-4-methyl-2-amino-1-hydroxybenzene, 5-nitro-4-methoxy-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 4-nitro-2-amino-1-hydroxybenzene-5- or -6-sulfonamide, 4- or 5-chloroanisidine, 4- or 5-nitroanisidine, 2-methoxy-5-methylaniline, 2,5-dimethoxyaniline, 2-anisidine-4- or -5-$\beta$-hydroxyethylsulfone, 4-methyl-6-sulfo-2-amino-1-hydroxybenzene, 2-amino-4-sulfo-1-hydroxybenzene, 4-chloro-6-sulfo-2-amino-1-hydroxybenzene, 6-chloro-4-sulfo-2-amino-1-hydroxybenzene, 5-nitro-4-sulfo-2-amino-1-hydroxybenzene, 4-nitro-6-sulfo-2-amino-1-hydroxybenzene, 6-nitro-4-sulfo-2-amino-1-hydroxybenzene, 4-acetylamino-2-amino-1-hydroxybenzene, 4-acetylamino-6-sulfo-2-amino-1-hydroxybenzene, 5-acetylamino-2-amino-1-hydroxybenzene, 6-acetylamino-4-sulfo-2-amino-1-hydroxybenzene, 4-chloro-2-amino-1-hydroxybenzene-5-sulfamide, 2-amino-1-hydroxybenzene-4-(N-2'-carboxyphenyl)sulfamide, 1-amino-2-hydroxy-4-sulfonaphthalene, 1-amino-2-hydroxy-4-sulfo-6-nitronaphthalene, 1-amino-2-hydroxy-4-sulfo-6-acetamidonaphthalene, 1-amino-2-hydroxy-4,8-disulfonaphthalene, 1-amino-2-hydroxy-6-sulfonaphthalene, 1-amino-2-hydroxy-7-sulfonaphthalene, 1-amino-2-hydroxy-8-sulfonaphthalene, 2-amino-1-hydroxy-4-sulfonaphthalene, 2-amino-1-hydroxy-6-sulfonaphthalene.

The coupling components of formula (13) can be derived for example from the following groups of coupling components:

Naphthols which couple in the ortho-position to the —OH group and are unsubstituted or substituted by chlorine, amino, acylamino, acyl, $C_1$–$C_4$alkyl, $C_1$–$C_4$alkoxy, sulfonamido, N-monosubstituted or N,N-disubstituted sulfonamido groups, sulfo and sulfone groups.

Naphthylamines which couple in the ortho-position to the amino group and are unsubstituted or substituted by halogen, preferably bromine, $C_1$–$C_4$alkyl, $C_1$–$C_4$alkoxy, sulfonamido, monosubstituted or disubstituted sulfonamido, sulfo or sulfone groups.

5-Pyrazolones and 5-aminopyrazoles which carry in the 1-position a phenyl or naphthyl radical which is unsubstituted or substituted by halogen, for example chlorine, or nitro, $C_1$–$C_4$alkyl and $C_1$–$C_4$alkoxy groups, sulfonamido, N-alkylated sulfonamido groups, sulfo or sulfone groups, and, in particular, by amino groups.

2,6-Dihydroxy-3-cyano- or 3-carbonamido-4-alkylpyridines and 6-hydroxy-2-pyridones which are substituted in the 1-position by unsubstituted or substituted $C_1$–$C_4$alkyl, for example methyl, isopropyl, $\beta$-hydroxyethyl, $\beta$-aminoethyl, $\gamma$-isopropoxypropyl or by —NH$_2$, or by a substituted amino group such as dimethylamino or diethylamino, and which carry in the 3-position a cyano or carbonamido group and, in the 4-position, a $C_1$–$C_4$alkyl group, preferably a methyl group.

Acetoacetanilides and benzoylacetanilides which may be substituted in the anilide nucleus by $C_1$–$C_4$alkyl, $C_1$–$C_4$alkoxy or $C_1$–$C_4$alkylsulfonyl groups, $C_1$–$C_4$-hydroxyalkyl, alkoxyalkyl or cyanoalkylsulfonyl groups, sulfonamido groups, N-alkylated sulfonamido groups, sulfo, acetylamino and halogen.

Phenols which are substituted by low molecular acylamino groups and/or $C_1$–$C_5$alkyl groups and which couple in the ortho-position.

Hydroxyquinolines which are unsubstituted or substituted by hydroxy.

Examples of such coupling components are: 2-naphthol, 1-naphthol, 1-hydroxynaphthalene-4- or 5-sulfonic acid, 1,3- or 1,5-dihydroxynaphthalene, 1-hydroxy-7-aminonaphthalene-3-sulfonic acid, 2-naphthol-6-sulfonamide, 1-hydroxy-7-N-methyl- or N-acetylaminonaphthalene-3-sulfonic acid, 2-naphthol-6-$\beta$-hydroxyethylsulfone, 1-hydroxy-6-amino- or -6-N-methyl- or -6-N-acetylaminonaphthalene-3-sulfonic acid, 1-hydroxy-7-aminonaphthalene-3,6-disulfonic acid, 1-hydroxy-6-aminonaphthalene-3,5-disulfonic acid, 1-acetylamino-7-naphthol, 1-hydroxy-6-N-(4'-aminophenyl)aminonaphthalene-3-sulfonic acid, 1-hydroxy-5-aminonaphthalene-3-sulfonic acid, 1-propionylamino-7-naphthol, 2-hydroxy-6-aminonaphthalene-4-sulfonic acid, 1-carbomethoxyamino-7-naphthol, 1-hydroxy-8-aminonaphthalene-5-sulfonic acid, 1-carboethoxy-amino-7-naphthol, 1-hydroxy-8-aminonaphthalene-5,7-disulfonic acid, 1-carbopropoxyamino-7-naphthol, 1-hydroxy-8-aminonaphthalene-3-sulfonic acid, 1-dimethylaminosulfonylamino-7-naphthol, 6-acetylamino-2-naphthol, 1-hydroxy-8-aminonaphthalene-3,5- or -3,6-disulfonic acid, 4-acetylamino-2-naphthol, 2-hydroxy-5-aminonaphthalene-4,7-disulfonic acid, 4-methoxy-1-naphthol, 4-acetylamino-1-naphthol, 1-naphthol-3, -4- or -5-sulfonamide, 2-naphthol-3-, -4-, -5-, -6-, -7- or -8-sulfonamide, 5,8-dichloro-1-naphthol, 5-chloro-1-naphthol, 2-naphthylamine, 2-naphthylamine-1-sulfonic acid, 2-aminonaphthalene-5-, -6- or -7-sulfonamide, 2-amino-6-N-(methyl, ethyl, isopropyl, $\beta$-oxyethyl or $\gamma$-methoxypropyl)naphthalene-6-sulfonamide, 2-aminonaphthalene-6-sulfanilide, 2-aminonaphthalene-6-N-methylsulfonanilide, 1-aminonaphthalene-3- , -4- or -5-sulfonamide, 1-aminonaphthalene-5-methyl- or -ethylsulfone, 5,8-dichloro-1-aminonaphthalene, 2-phenylaminonaphthalene, 2-N-methylaminonaphthalene, 2-N-ethylaminonaphthalene, 2-phenylaminonaphthalene-5-, -6- or -7-sulfonamide, 2-(3'-chlorophenylamino)naphthalene-5-, -6- or -7-sulfonamide, 6-methyl-2-aminonaphthalene, 6-bromo-2-aminonaphthalene, 6-methoxy-2-aminonaphthalene, 1,3-dimethylpyrazolone, 3-methyl-5-pyrazolone, 1-phenyl-3-methyl-5-pyrazolone, 1-phenyl-3-carbonamido-5-pyrazolone, 1-(2'-, 3'- or 4'-methylphenyl)-3-methyl-5-pyrazolone, 1-[3'- or 4'-($\beta$-hydroxyethylsulfonyl)phenyl]-3-methyl-5-pyrazolone, 1-(2'-methoxyphenyl)-3-methyl-5-pyrazolone, 1-(2'-, 3'- or 4'-chlorophenyl)-3-methyl-5-pyrazolone, 1-(2'-, 3'- or 4'-nitrophenyl)-3-methyl-5-pyrazolone, 1-(2',5'- or 3',4'-dichlorophenyl)-3-methyl-5-pyrazolone, 1-(2'-, 3'- or 4'-sulfamoylphenyl)-3-methyl-5-pyrazolone, 1-(2'-, 3'- or 4'-methylsulfonylphenyl)-3-methyl-5-pyrazolone, 2,6-dihydroxy-3-cyano-4-methylpyridine, 1-methyl-3-cyano-4-ethyl-6-hydroxypyrid-2-one, 1-amino-3-cyano-4-methyl-6-hydroxypyrid-2-one, 1-phenyl-3-carbonamido-4-methyl-6-hydroxypyrid-2-one, acetoacetanilide, acetoacet-o-, -m- or -p-sulfoanilide, acetoacet-4-($\beta$-hydroxyethylsulfonyl)anilide, acetoacet-o-anisidide, acetoacetnaphthylamide, acetoacet-o-toluidide, acetoacet-o-chloroanilide, acetoacet-m- or -p-chloroanilide, acetoacetanilide-3- or -4-sulfonamide, acetoacet-3- or -4-aminoanilide, acetoacet-m-xylidide, benzoylacetanilide, 4-methylphenol, 3-dialkylaminophenol, in particular 3-dimethylamino- and 3-diethylaminophenol, 4-t-butylphenol, 4-t-amylphenol, 2- or 3-acetylamino-4-methylphenol, 2-methoxycarbonylamino-4-methylphenol, 2-ethoxycarbonylamino-4-methylphenol, 3,4-dimethylphenol and 2,4-dimethylphenol, 1-(4'-aminophenyl)-3-methyl-5-pyrazolone, 1-(2'-, 3'- or 4'-sulfophenyl)-3-methyl-5-pyrazolone, 1-(2'-chloro-4'- or 5'-sulfophenyl)-3-methyl-5-pyrazolone, 1-(2'-methyl-6'-chlorophenyl)-3-methyl-5-pyrazolone, 1-(2'-methyl-4'-sulfophenyl)-3-methyl-5-pyrazolone, 1-(2'-, 3'- or 4'-chloro- or methyl- or sulfophenyl)-3-carboxy-5-pyrazolone, 1-[5'-sulfonaphth-2-yl]-3-methyl-5-pyrazolone, 1-[4''-amino-2-',2''-disulfo-4'-stilbene]-3-methyl-5-pyrazolone, 1-ethyl-3-cyano-4-methyl-6-hydroxypyrid-2-one, 1-ethyl-3-sulfomethyl-4-methyl-6-hydroxypyrid-2-one, 2,6-dihydroxy-3-cyano-4-sulfomethylpyridine, 2,4,6-trihydroxypyrimidine.

To prepare the azomethine dyes of the formula (11), the amines of formula (12) specified above are condensed in known manner with o-hydroxybenzaldehydes or o-hydroxynaphthaldehydes.

Examples of suitable aldehydes are: 2-hydroxybenzaldehyde, 3- and 5-methyl-2-hydroxybenzaldehyde, 3,5- and 3,6-dimethyl-2-hydroxybenzaldehyde, 5-butyl-2-hydroxybenzaldehyde, 5-chloro- or 5-bromo-2-hydroxybenzaldehyde, 3- and 4-chloro-2-hydroxybenzaldehyde, 3,6-dichloro-2-hydroxybenzaldehyde, 3-chloro-5-methyl-2-hydroxybenzaldehyde, 3-methyl-5-chloro-2-hydroxybenzaldehyde, 3- and 4- and 5-nitro-2-hydroxybenzaldehyde, 3,5-dinitro- and 4-chloro-5-nitro-2-hydroxybenzaldehyde, 4-methoxy-2-hydroxybenzaldehyde, 1-hydroxy-2-naphthaldehyde and its derivative which is chlorinated in the 4-position; and 2-hydroxy-1-naphthaldehyde.

Preferred chromium and cobalt complexes of this invention are those wherein Y is a nitrogen atom and K is the radical of a coupling component of the naphthalene series.

If desired, a free amino group in the radical D and/or K can be converted into an acylamino or alkylamino group after coupling with an acylating or alkylating agent, and likewise a hydroxyl group in the radical D and/or K can be converted by alkylation into an alkoxy group.

A further embodiment of the process for the preparation of the 1:1 chromium or cobalt complex azomethine dye of the formula (10) resides in the feature that the 1:1 chromium or cobalt complex of the formula (10) can also be prepared with a mixture of the amine of formula (12) and an o-hydroxyaldehyde instead of with the azomethine of the formula (11).

The preparation of the 1:1 chromium or cobalt complexes is effected by methods which are known per se. For example, the 1:1 chromium complex of the compound of formula (10) is prepared by reacting the metal-free compound, in acid medium, with a salt of trivalent chromium such as chromium chloride, chromium fluoride or chromium sulfate, optionally in the presence of solubilisers or chroming catalysts, for example alcohols or hydroxycarboxylic acids. Then the 1:1 complex is reacted, in the pH range from 5 to 9, with a compound which introduces the radical B.

The preparation of the 1:1 cobalt complexes of the formula (10) is effected by methods which are known per se. For example, the 1:1 cobalt complex of the formula (10) is prepared by reacting the metal-free compound, in a manner known per se, with a colourless cobalt(III) complex compound in a weakly acid, neutral or alkaline solution or dispersion. Suitable cobalt(III) complex compounds are the reaction products of a colourless complexing or chelating agent such as diethylenetriamine, ammonia or $NO_2^{\ominus}$ ions, with a cobalt(II) or cobalt(III) salt such as cobalt(III) hexamine, cobalt(III) trichloride, cobalt(II) chloride, cobalt(II) sulfate or cobalt(II) acetate.

The reaction to give the cobalt complex of formula (1) is carried out in the pH range from 5 to 9 with a compound that introduces the radical B.

The metallising of the azo or azomethine compound is preferably carried out in aqueous solution, optionally with the addition of an organic solvent such as an alcohol or dimethylformamide, or else in a pure organic solvent, for example in an alcohol, a glycol, a glycol ether or glycol ester, glycerol or a ketone, for example methyl isobutyl ketone. Metallising is conveniently effected in weakly acid or alkaline medium, preferably in the pH range from 5 to 9. To hasten the metallising, an oxidising agent such as hydrogen peroxide or nitrobenzenesulfonic acid can be added to the reaction solution.

Suitable compounds that introduces the radical B are complexable acyl hydrazones, semicarbazones or thiosemicarbazones, or precursors thereof, which are able to form two covalent bonds and one co-ordinative bond with the chromium or cobalt atom.

Particulary preferred compounds that introduce the radical B are the compounds of formula

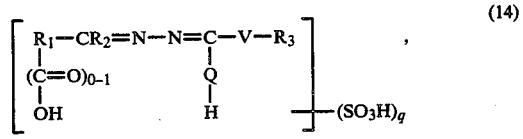

(14)

wherein $R_1$, $R_2$, V, $R_3$ and Q are as defined for formula (3), and q is 0, 1 or 2. The compounds of formula (14), which are devoid of sulfo groups, are known and are prepared by methods which are known per se. The compounds of formula (14), wherein q is 1 or 2, are novel. They are prepared by reacting, for example, a hydrazide of formula

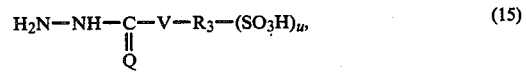

(15)

wherein Q, V and $R_3$ are as defined for formula (3), and u is 0, 1 or 2, in a manner known per se, with a complexable carbonyl compound of the formula

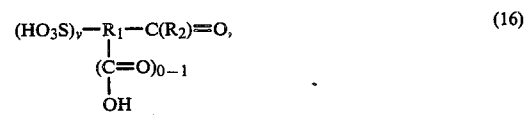

(16)

wherein $R_1$ and $R_2$ are as defined for formula (3), and v is 0, 1 or 2, with the proviso that the sum of $u+v$ must be 1 or 2; or by reacting a hydrazide of formula (15) with an aldimine of the formula

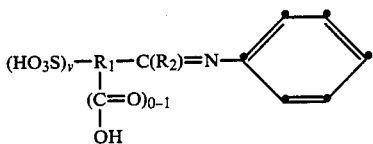

wherein $R_1$, $R_2$ and v are as defined for formula (16), and the sum of u+v must be 1 or 2; or by reacting a complexable hydrazone of formula

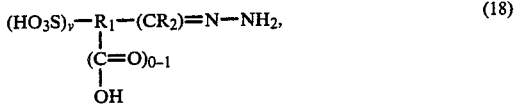

wherein $R_1$, $R_2$ and v are as defined for formula (16), in a manner known per se, with a compound which forms the radical of the formula

wherein Q, V, $R_3$ and u are as defined for formula (15), and the sum of u+v must be 1 or 2.

Examples of suitable compounds which form the radical of the formula (19) are those of the formula

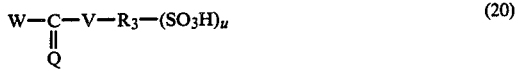

wherein Q, V, $R_3$ and u are as defined for formula (19), and W is a removable radical, for example the radical of an anhydride, or a halogen atom, preferably a chlorine or bromine atom.

Representative examples of compounds of formula (15) are: monoformylhydrazine, monoacetylhydrazine, monopropionylhydrazine, monobenzoylhydrazine, mono-(4-chlorobenzoyl or 4-nitrobenzoyl)hydrazine, semicarbazide, thiosemicarbazide, salicylhydrazide, 5-hydroxysalicylhydrazide, 4-trifluoromethylsalicylhydrazide, pyridinecarboxylic acid hydrazide, 6-chloro-3-hydroxyquinoline-4-carboxylic acid hydrazide.

Representative examples of compounds of formula (16) are: 4-chlorosalicycaldehyde, 5-chlorosalicylaldehyde, 3-nitrosalicylaldehyde, 5-nitrosalicylaldehyde, 3,5-dichlorosalicylaldehyde, 3,5-dibromosalicylaldehyde, 5-phenylazosalicylaldehyde, 5-sulfosalicylaldehyde, 5-(4'-sulfophenylazo)salicylaldehyde, 5-(2'-chlorophenylazo)salicylaldehyde, 5-(2,5-dichlorophenylazo)salicylaldehyde, 5-(2'-methylphenylazo)salicylaldehyde, 5-(2'-methoxyphenylazo)salicylaldehyde, 5-(2'-methoxy-4'-nitrophenylazo)salicylaldehyde, 5-(2'-sulfo-4'-nitrophenylazo)salicylaldehyde, 2-hydroxynaphthaldehyde, 6-bromo-2-hydroxynaphthaldehyde, 5-nitro-2-hydroxynaphthaldehyde, 2-hydroxy-3-carboxynaphthaldehyde, 2-hydroxy-3-methoxycarbonylnaphthaldehyde, 2-hydroxy-3-phenylcarbamoylnaphthaldehyde, 2,6-dihydroxy-4-methyl-5-cyano-3-pyridinaldehyde, 2,6-dihydroxy-4-methyl-5-carbamoyl-3-pyridinaldehyde, 2,4-dihydroxyquinoline-3-aldehyde, 2,4-dihydroxy-3-acetylquinoline, 2-hydroxyacetophenone, 2-hydroxybenzophenone, glycolaldehyde, glyoxylic acid, pyruvic acid, acetonedicarboxylic acid, methyl, ethyl or propyl acetate, acetylacetone, diacetone alcohol, acetoacetanilide, benzoylacetone, 2-phenyl-4,6-dihydroxy-5-pyrimidinaldehyde, 1-phenyl-3-methyl-4-formyl-5-hydroxypyrazole.

Suitable compounds of the formula (17) are the same compounds cited as exemplary of compounds of formula (16), but which carry a phenylaldimine radical instead of the carbonyl group.

Suitable compounds of the formula (18) are the reaction products of the compounds cited as exemplary of compounds of the formula (16) with hydrazine.

Typical examples of compounds of the formula (20) are: acetic anhydride, propionic anhydride, methyl acetate, ethyl acetate, methyl propionate, ethyl propionate, methyl formate, ethyl formate, methyl carbamate and ethyl carbamate.

The chromium or cobalt complexes of formula (1) can also be prepared by reacting the 1:1 chromium or cobalt complex of the formula (10) with precursors of the compound that introduces the radical B. These process variants comprise (a) using as precursor of the compound that introduces the radical B a complexable hydrazide together with a complexable carbonyl compound;

(b) using as precursor of the compound that introduces the radical B a complexable hydrazone together with a complexable acyl radical.

A further embodiment of the process of the invention comprises reacting a compound that introduces the radical B with an agent that introduces the chromium atom to give the 1:1 chromium complex, and subsequently reacting the 1:1 chromium complex with a metal-free complexable azo or azomethine dye.

If the compounds employed as compounds that introduce the radical B are those of the formula (10), wherein q is 1 or 2, then these 1:1 chromium or cobalt complexes are novel.

The chromium or cobalt complexes of the formula (1) are suitable for dyeing nitrogen-containing materials and materials that contain hydroxyl grops, for example cotton, silk, leather and, in particular, wool and synthetic polyamides. The dyes of formula (1) which are devoid of sulfo groups are particularly suitable for colouring lacquers and spinning compositions. Level dyeings in yellow, brown, orange, red, glue, grey, green and black shades of good allround fastness properties are obtained, in particular very good fastness to rubbing, wet treatments, wet rubbing and light. In addition, the dyes of this invention can be readily combined with other acid dyes. The above mentioned textile material can be in a wide variety of processing forms, for example as filaments, yarn, woven or knitted fabrics.

In the following Examples parts are by weight. The relationship between parts by weight and parts by volume is the same as that between the gram and the cubic centimeter.

EXAMPLE 1

9.38 parts of the 1:1 chromium complex of the azo dye obtained from diazotised 4-nitro-2-amino-1-hydroxybenzene-6-sulfonic acid and 1-phenyl-3-methylpyrazol-5-one, which complex contains 1 atom of chrome per 1 molecule of monoazo dye and is obtainable in known manner, are suspended in 200 parts of water at 80°–85° C. After addition of 4.8 parts of the reaction product of salicylaldehyde and monobenzoylhydrazine, the reaction mixture is adjusted to a constant pH of 7.5–8.0 by the dropwise addition of a 2N sodium hydroxide solution, and then stirred at 80°–85° C. until the starting materials are no longer detectable in the resultant clear orange solution.

The chromatographically homogeneous metal complex dye of the constitution:

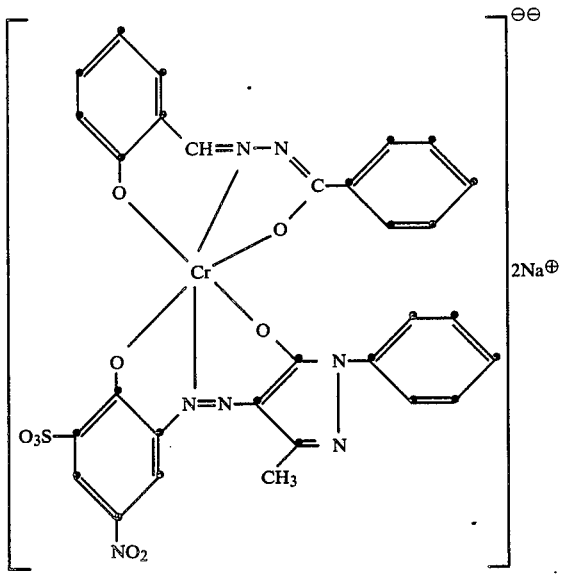

is salted out of the reaction solution with sodium chloride, isolated by filtration, washed with a dilute solution of sodium chloride and dried in vacuum at 80° C. The novel dye is readily water-soluble and dyes wool or polyamide fibres from a weakly acid bath in full, yellowish orange shades of good fastness properties, especially good lightfastness.

Reaction of the above 1:1 chromium complex, under the same reaction conditions, initially with 2.4 parts of salicylaldehyde and then with 2.72 parts of monobenzoylhydrazine, affords a chromatographically identical complex dye with the same coloristic properties.

Preparation of the acylhydrazone compound: 2.4 parts of salicylaldehyde are mixed with 20 parts of ethyl alcohol. After addition of 2.72 parts of monobenzoylhydrazine, the reaction mixture is kept under reflux for 1 hour. On slowly cooling the reaction mixture to about 10° C., the compound of the formula

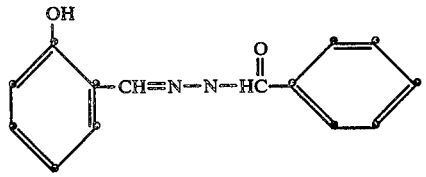

crystallises in the form of faintly greenish yellow prisms. These are filtered, washed with a small amount of cold ethyl alcohol and recrystallised from absolute ethyl alcohol, affording 4.2 g (90% of theory) of faintly greenish yellow crystals with a melting point of 167°–169° C.

EXAMPLE 2

Under the reaction conditions of Example 1, 8.76 parts of the 1:1 chromium complex of the azo dye obtained from diazotised 5-nitro-2-amino-1-hydroxybenzene and 2-aminonaphthalenesulfonic acid, which complex contains 1 atom of chromium per 1 molecule of monoazo dye and is obtainable in known manner, are reacted with the hydrazone compound obtained from 2.4 parts of salicylaldehyde and 1.48 parts of monoacetylhydrazine. The chromatographically homogeneous complex dye of the structure:

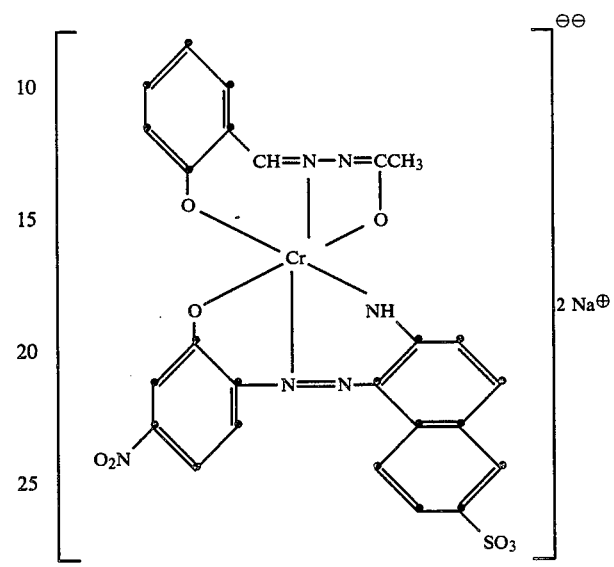

dyes woollen fabric or polyamide fibres from a weakly acid bath in full bluish green shades of good wet- and lightfastness.

Preparation of the hydrazone compound: 24 parts of salicylaldehyde are mixed with 200 parts of ethyl alcohol. After addition of 14.8 parts of monoacetylhydrazine, the reaction mixture is heated, with stirring, to the boil and kept under reflux for 2 hours. After cooling to 5°–10° C., the precipitated crystals are isolated by filtration, washed with cold ethyl alcohol and recrystallised from the same solvent. The compound, which is obtained in a yield of 92% of theory, forms faintly yellowish needle-shaped crystals with a melting point of 199°–201° C. and has the following structure:

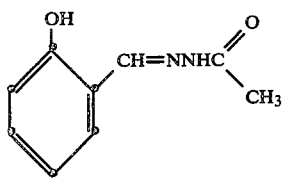

EXAMPLE 3

8.88 parts of the 1:1 chromium complex of the azo dye obtained from diazotised 1-amino-2-hydroxynaphthalane-4-sulfonic acid and 2-hydroxynaphthalene, which complex contains 1 atom of chromium per 1 molecule of monoazo dye and is obtainable in known manner, are suspended in 200 parts of water at 70°–75° C. and dissolved by adding 2N sodium hydroxide solution until the pH is 7.5–8.0, brought into solution. After addition of 3.28 parts of the condensate of salicylaldehyde and monoformylhydrazine, the reaction mixture is stirred at 70°–75° C. while maintaining a pH range of 7.5–8.0 until no more starting materials can be detected. The complex dye of the formula

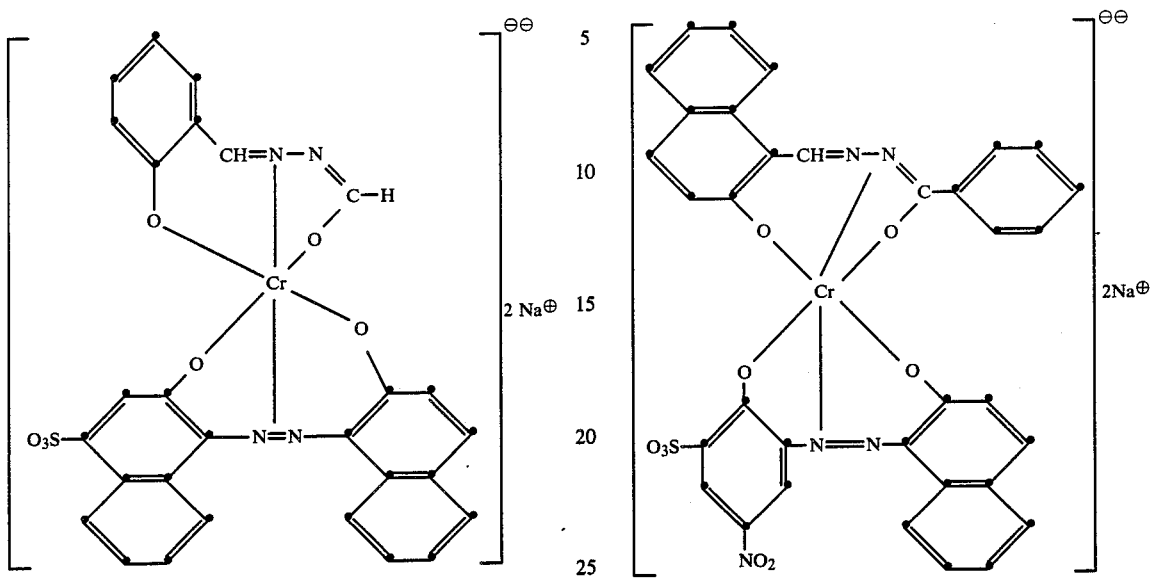

which is present in clear solution, is isolated in accordance with the particulars of Example 1.

The readily water-soluble dye gives full, greenish blue shades of good fastness properties on woollen fabric or polyamide from a weakly acid bath.

The reaction product of salicylaldehyde and monoformylaldehyde is obtained by reacting the two components in boiling ethyl alcohol, cooling the reaction mixture to 10° C. and isolating the precipitate in the form of pale greenish yellow crystals with a melting point of 178°–180° C.

EXAMPLE 4

8.78 parts of the 1:1 chromium complex of the monoazo dye obtained from diazotised 1-hydroxy-2-amino-4-nitrobenzene-6-sulfonic acid and 2-hydroxynaphthalene are reacted, in accordance with the particulars of Example 3, with the hydrazone compound obtained from 3.44 parts of 2-hydroxy-1-naphthaldehyde and 2.72 parts of monobenzoylhydrazine to give the homogeneous complex dye of the following structure:

This novel dye gives full, wet- and lightfast dark brown dyeings on woollen fabric, polyamide materials and on chrome leather.

EXAMPLE 5

9.38 parts of the 1:1 chromium complex described in Example 1 are suspended in 200 parts of water of 60°–65° C. and dissolved by adding 2N sodium hydroxide solution until the pH is 7.5–8.0. Then 2.75 parts of the monoazomethine compound obtained from salicylaldehyde and hydrazine, prepared according to the method of H. Cajar, Chem. Ber. 31 (1898), 2806, are added in the form of an alcoholic solution. After stirring for 30 minutes at 60°–65° C. in the pH range from 7–8, 2.2 parts of acetic anhydride are slowly added dropwise while simultaneously maintaining a pH range from 7.5–8.5 with 2N sodium carbonate solution. Stirring is continued for 1 hour at 60°–65° C. to give a clear orange red solution which contains the chromatographically homogeneous complex dye of the following constitution:

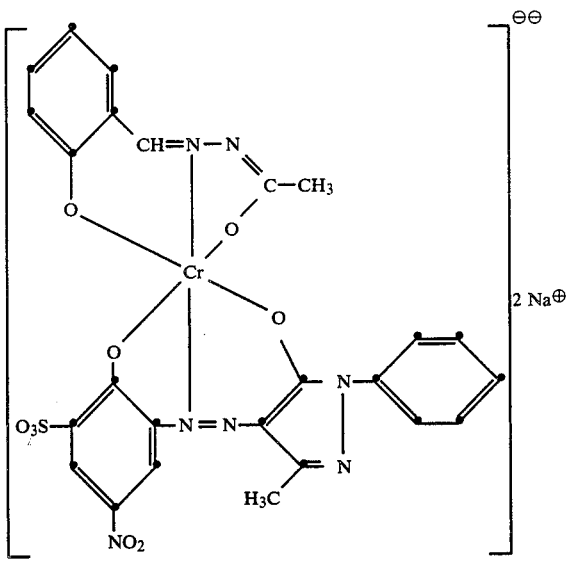

A chromatographically identical dye is obtained by addition of the acylhydrazone described in Example 2 and monoacetylhydrazine to the above 1:1 chromium complex.

EXAMPLE 6

7.76 parts of the 1:1 chromium complex of the known azomethine dye obtained from 1-hydroxy-2-amino-4-nitrobenzene-6-sulfonic acid and salicylaldehyde are reacted in 200 parts of water at 70°–75° C. and pH 7.5–8.5 with 2.62 parts of the hydrazone compound obtained from salicylaldehyde and 4-nitrobenzhydrazide to give the homogeneous complex dye of the following structure:

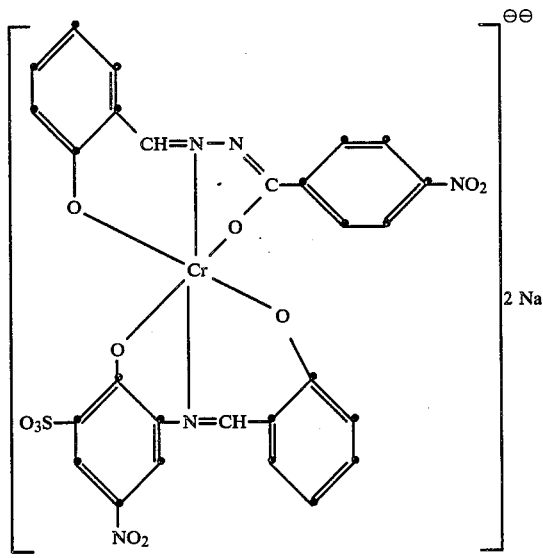

This novel dye, which is worked up as described in Example 1, dyes polyamide fibres in yellow shades of good light- and wetfastness.

EXAMPLE 7

4.8 parts of the acylhydrazone compound obtained from salicylaldehyde and monobenzoylhydrazine and described in Example 1, last paragraph, are suspended, with stirring, in 80 parts of ethylene glycol monomethyl ether, and dissolved by heating to 50°–60° C. After addition of 5.35 parts of chromium(III) chloride hexahydrate, the reaction mixture is heated to 112°–115° C. and stirred at this temperature under reflux until the acylhydrazone compound is completely converted to the 1:1 chromium complex in the form of a clear greenish yellow solution.

After cooling to about 80° C., the solution of the 1:1 chromium complex is stirred dropwise over 20 minutes into a warm solution of 80° C. of 7.76 parts of the monoazo dye obtained from diazotised 1-hydroxy-2-amino-5-nitrobenzene and 2-aminonaphthalene-6-sulfonic acid in 150 parts of water and 20 parts of 2N sodium carbonate solution. A clear, dark green solution of the following complex dye is obtained:

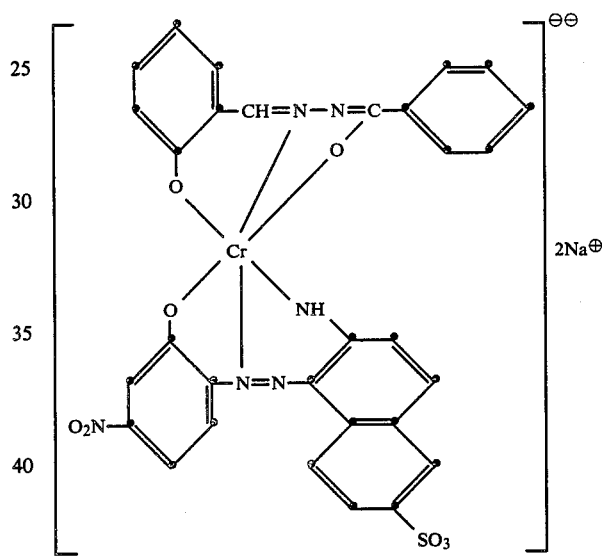

A chromatographically identical dye is obtained by addition of the metal-free acylhydrazone compound to the 1:1 chromium complex of the above monoazo dye under the reaction conditions of Example 2.

The novel dye has coloristic properties similar to those of the metal complex dye described in Example 2.

EXAMPLE 8

With stirring, 8.88 parts of the 1:1 chromium complex of the monoazo dye obtained from diazotised 1-amino-2-hydroxynaphthalene-4-sulfonic acid and 2-hydroxynaphthalene are suspended in 200 parts of water of 70°–75° C. and dissolved by addition of 2N sodium hydroxide solution until a constant pH of 7.5–8.0 is attained. After addition of 3.6 parts of salicylaldehyde semicarbazone (obtained in known manner), the reaction mixture is stirred at 70°–75° C. and pH 7.5–8.0 until complete conversion of both starting materials to the greenish blue complex of the probable structure:

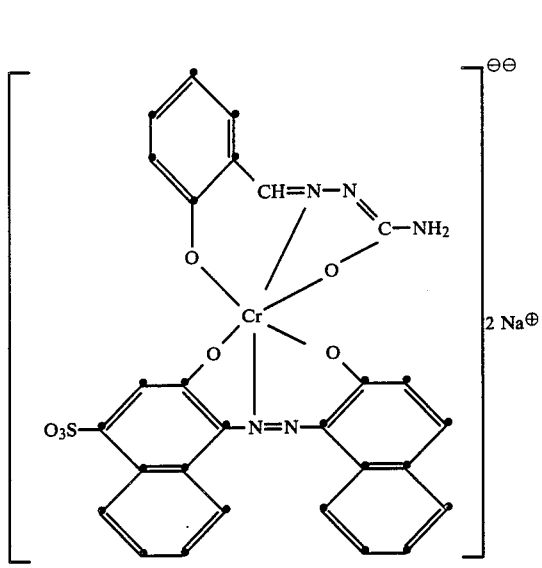

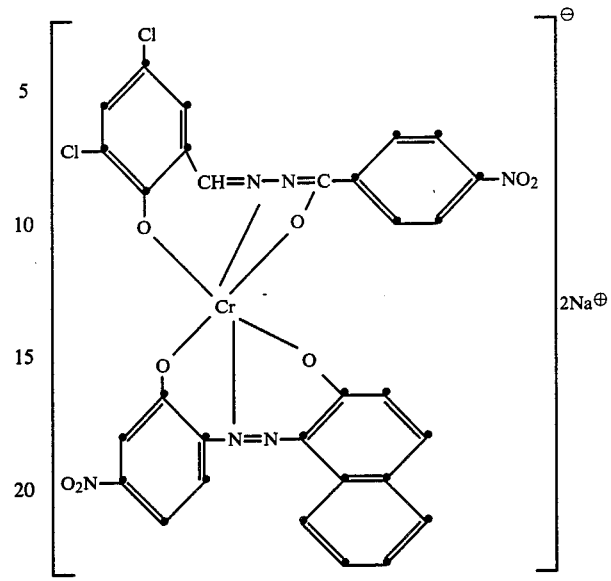

The dye is isolated as described in Example 1 and dyes wool and polyamide fibres from a weakly acid bath in full greenish blue shades of good wet- and lightfastness.

A chromatographically homogeneous dye which dyes wool and polyamide fibres in fast greenish blue shades is also obtained by reacting the above 1:1 chromium complex with 3.9 parts of salicylaldehyde thiosemicarbazone under the indicated reaction conditions.

EXAMPLE 9

With stirring, 6.18 parts of the monoazo dye obtained from 1-hydroxy-2-amino-5-nitrobenzene and 2-hydroxynaphthalene are suspended in 80 parts of ethylene glycol and, after addition of 5.4 g of chromium(III) chloride hexahydrate, the mixture is stirred at 120°–125° C. until complete metallisation to the 1:1 chromium complex in the form of a clear reddish blue solution has been effected. After cooling the solution to about 80° C., 6.0 parts of anhydrous sodium carbonate and 7.1 parts of the hydrazone compound obtained from 3,5-dichlorosalicylaldehyde and mono-4-nitrobenzolyhydrazine are added. Conversion to the greenish blue complex dye of the structure:

is rapid and complete. Insoluble inorganic salts are removed by filtration and the resultant clear solution can be used as obtained for colouring lacquers or spinning compositions.

EXAMPLE 10

In accordance with the particulars of Example 9, 8.15 parts of the monoazo dye obtained from diazotised 1-hydroxy-2-aminobenzene-5-sulfonamide and 1-(4'-chlorophenyl)-3-methylpyrazol-5-one are converted into the corresponding 1:1 chromium complex. After cooling to about 80° C., 8.4 parts of sodium bicarbonate and then 4.8 parts of the acylhydrazone obtained from salicylaldehyde and monobenzoylhydrazine are added to the clear red solution of the chromium complex and the batch is stirred until both starting materials can no longer be detected. The resultant deep red solution contains the homogeneous chromium complex of the following structure:

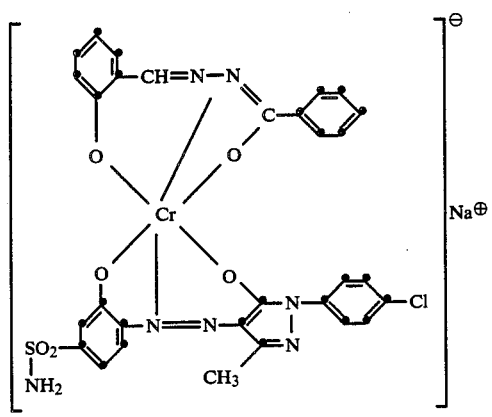

The dye is salted out by pouring the reaction solution into a concentrated solution of sodium chloride. The precipitated dye is isolated by filtration, washed with a dilute solution of sodium chloride and then vacuum dried at 80° C. The readily water-soluble dye gives full scarlet shades of very good wet- and lightfastness on synthetic polyamide materials.

EXAMPLE 11

7.26 parts of the monoazo dye obtained from diazotised 1-hydroxy-2-amino-4-chlorobenzene and 1-(3'-chlorophenyl)-3-methylpyrazol-5-one are converted into the 1:1 chromium complex, as in Example 9, by metallisation with chromium(III) chloride hexahydrate in ethylene glycol. After cooling to about 80° C., the bluish red solution is added dropwise into a stirred solution of 4.04 parts of salicylaldehyde-5-sulfonic acid and 2.72 parts of monobenzoylhydrazone in 200 parts of water of 70° C. and 60 parts of a 2N sodium carbonate solution. A clear red solution of the following complex dye is obtained:

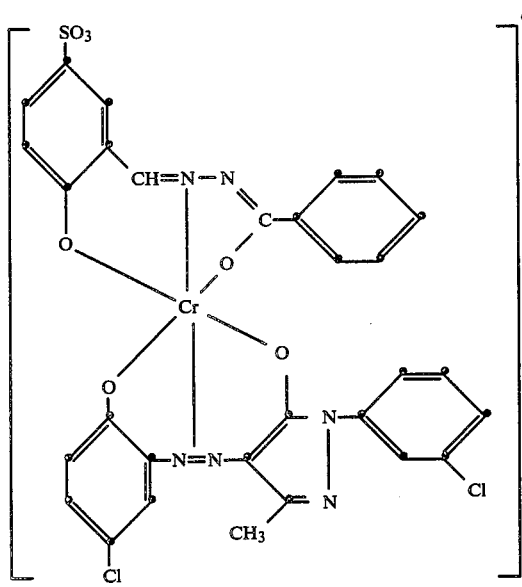

The novel dye is precipitated with sodium chloride, isolated by filtration, washed with a dilute solution of sodium chloride and dried. It dyes wool and polyamide fibres from a weakly acid bath in full wet- and lightfast red shades.

EXAMPLE 12

With stirring, 8.57 parts of the conventionally obtained 1:1 chromium complex of the known monoazo dye obtained from diazotised 1-hydroxy-2-amino-4-chlorobenzene-6-sulfonic acid and 2-hydroxynaphthalene are suspended in 200 parts of water of 20°-25° C. and dissolved by addition of 2N sodium hydroxide solution until the pH is 8.5–9.0. After addition of a solution of 2.2 parts of sodium pyruvate in 20 parts of water, a solution of 1.48 parts of monoacetylhydrazine in 20 parts of water is added.

The reaction mixture is subsequently stirred at 20°-25° C. while keeping a moderately alkaline reaction (pH 8–9) until complete conversion of the starting materials to the homogeneous chromium complex of the following probable structure:

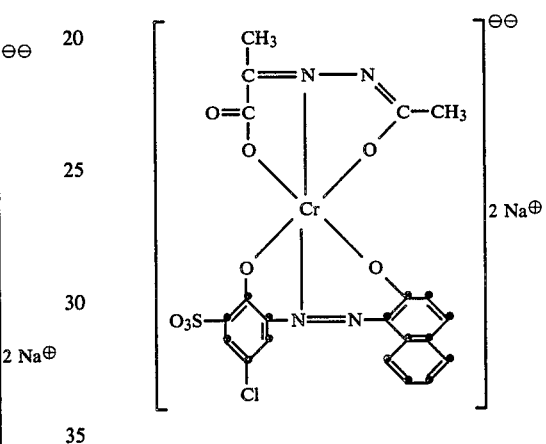

The novel dye is precipitated from the reaction solution with sodium chloride and worked up in conventional manner. It dyes woollen fabric or polyamide fibres from a weakly acid bath in full bluish violet shades of good fastness properties.

Further metal complex dyes with similar properties are obtained in analogous manner by reacting 1:1 chromium complexes of the monoazo or azomethine compounds listed in column I of Table I with the acylhydrazones of the carbonyl components listed in column II and the monoacylhydrazines of column III. Column IV indicates the shades obtainable on wool, synthetic polyamide fibres or leather, in accordance with the Dyeing Examples.

TABLE I

| Example | I | II | III | IV |
|---|---|---|---|---|
| 13 | [pyrazolone azo benzene with COOH, HO, H₃C, SO₃H substituents] | salicylaldehyde (2-hydroxybenzaldehyde) | H₂NNHC(=O)H | yellow |
| 14 | [pyrazolone azo benzene with COOH, HO, H₃C, SO₃H substituents] | salicylaldehyde | H₂NNHC(=O)CH₃ | yellow |
| 15 | [pyrazolone azo benzene with COOH, HO, CH₃, SO₃H substituents] | salicylaldehyde | H₂NNHC(=O)H | yellow |
| 16 | [pyrazolone azo benzene with COOH, HO, CH₃, SO₂NH₂ substituents, N-phenyl] | salicylaldehyde | H₂NNHC(=O)CH₃ | yellow |

TABLE I-continued

| Example | I | II | III | IV |
|---|---|---|---|---|
| 17 | (2-COOH-phenyl)-N=N-C(OH)=C(CH₃)-N=N-(3-Cl-phenyl) | 2-OH, 5-SO₃H-benzaldehyde | H₂NNHC(=O)CH₃ | yellow |
| 18 | (2-OH, 4-NO₂, 5-SO₃H-phenyl)-N=N-C(=C(OH)CH₃)-C(=O)NH-phenyl | 2-OH-benzaldehyde | H₂NNHC(=O)CH₃ | yellow |
| 19 | (2-OH, 4-NO₂, 5-SO₃H-phenyl)-N=N-C(=C(OH)CH₃)-C(=O)NH-phenyl | 2-OH-benzaldehyde | H₂NNHC(=O)-phenyl | yellow |
| 20 | (2-OH, 4-NO₂, 5-SO₃H-phenyl)-N=N-C(=C(OH))-C(CH₃)=N-N-phenyl | 2-OH-benzaldehyde | H₂NNHC(=O)H | orange |

TABLE I-continued

| Example | I | II | III | IV |
|---|---|---|---|---|
| 21 | HO₃S-C₆H₂(OH)(NO₂)-N=N-C(HO)=C(CH₃)-N=N-C₆H₅ | 2-hydroxybenzaldehyde | H₂NNHC(=O)CH₂CH₃ | orange |
| 22 | HO₃S-C₆H₂(OH)(NO₂)-N=N-C(HO)=C(CH₃)-N=N-C₆H₅ | 2-hydroxybenzaldehyde | H₂NNHC(=O)-C₆H₄-Cl | orange |
| 23 | O₂N-C₆H₂(OH)(SO₃H)-N=N-C(HO)=C(CH₃)-N=N-C₆H₅ | 2-hydroxybenzaldehyde | H₂NNHC(=O)-C₆H₄-Cl | reddish orange |
| 24 | O₂N-C₆H₂(OH)(SO₃H)-N=N-C(HO)=C(CH₃)-N=N-C₆H₅ | 2-hydroxybenzaldehyde | H₂NNHC(=O)CH₃ | reddish orange |

TABLE I-continued

| Example | I | II | III | IV |
|---|---|---|---|---|
| 25 | [2-hydroxy-4-chloro-5-sulfo-phenyl azo to 3-methyl-phenylazo-pyrazolone with phenyl] | salicylaldehyde | H₂NNHC(=O)H | red |
| 26 | [2-hydroxy-4-chloro-5-sulfo-phenyl azo to 3-methyl-phenylazo-pyrazolone with phenyl] | salicylaldehyde | H₂NNHC(=O)CH₃ | red |
| 27 | [2-hydroxy-4-chloro-5-sulfo-phenyl azo to 3-methyl-phenylazo-pyrazolone with phenyl] | salicylaldehyde | H₂NNHC(=O)C₆H₅ | red |
| 28 | [2-hydroxy-5-sulfamoyl-phenyl azo to 3-methyl-phenylazo-pyrazolone with 3-chlorophenyl] | salicylaldehyde | H₂NNHC(=O)CH₃ | orange |

TABLE I-continued

| Example | I | II | III | IV |
|---|---|---|---|---|
| 29 | [pyrazolone azo dye: 4-nitro-2-hydroxyphenyl–N=N–C(OH)=C(CH3)–N=N–phenyl] | 2-hydroxy-5-sulfo-benzaldehyde | H2NNHC(=O)CH3 (acethydrazide) | orange |
| 30 | [pyrazolone azo dye: 4-nitro-2-hydroxyphenyl–N=N–C(OH)=C(CH3)–N=N–phenyl] | 2-hydroxy-5-sulfo-benzaldehyde | H2NNHC(=O)–phenyl (benzhydrazide) | bluish red |
| 31 | [pyrazolone azo dye: 4-methyl-2-hydroxy-6-nitro variant] | 2-hydroxy-5-sulfo-benzaldehyde | H2NNHC(=O)–phenyl | scarlet red |
| 32 | [pyrazolone azo dye: 3,5-dichloro-2-hydroxyphenyl variant] | 2-hydroxy-5-sulfo-benzaldehyde | H2NNHC(=O)CH3 | bluish red |

TABLE I-continued

| Example | I | II | III | IV |
|---|---|---|---|---|
| 33 | (1-phenylazo-2-hydroxy-6-sulfo naphthalene with N=N-CH3 group) | salicylaldehyde | H2NNHC(O)CH3 | pink |
| 34 | (same as 33) | salicylaldehyde | phenyl-C(O)-NHNH2 | pink |
| 35 | (1-phenylazo-2-hydroxy-6-nitro naphthalene with N=N-CH3 group) | 2-hydroxy-1-naphthaldehyde | phenyl-C(O)-NHNH2 | claret |
| 36 | (same as 35) | 2-hydroxy-1-naphthaldehyde | H2NNHC(O)CH2CH3 | claret |

TABLE I-continued

| Example | I | II | III | IV |
|---|---|---|---|---|
| 37 | HO₃S-naphthalene-OH-N=N-naphthalene-OH | 2-hydroxybenzaldehyde (salicylaldehyde) | H₂NNHC(=O)CH₃ | blue |
| 38 | HO₃S-naphthalene-OH-N=N-naphthalene-OH | 2-hydroxybenzaldehyde | H₂NNHC(=O)-phenyl | greyish blue |
| 39 | HO₃S-naphthalene-OH-N=N-naphthalene-OH | 2'-hydroxyacetophenone | H₂NNHC(=O)H | blue |
| 40 | HO₃S-naphthalene-OH-N=N-naphthalene-OH | 2'-hydroxyacetophenone | H₂NNHC(=O)CH₃ | blue |

TABLE I-continued

| Example | I | II | III | IV |
|---|---|---|---|---|
| 41 | naphthalene-OH with N=N to phenyl bearing OH, HO₃S, Cl | 2-hydroxybenzaldehyde (OH, C(=O)H) | H₂NNHC(=O)CH₃ | bluish violet |
| 42 | naphthalene-OH, SO₃H with N=N to phenyl bearing OH, Cl | 2-hydroxybenzaldehyde | H₂NNHC(=O)CH₃ | violet |
| 43 | naphthalene-OH, SO₃H with N=N to phenyl bearing OH, O₂N | 2-hydroxybenzaldehyde | H₂NNHC(=O)CH₃ | blue |
| 44 | naphthalene-OH, SO₃H, SO₃H with N=N to phenyl bearing OH, O₂N | 2-hydroxybenzaldehyde | H₂NNHC(=O)–phenyl | blue |

TABLE I-continued

| Example | I | II | III | IV |
|---|---|---|---|---|
| 45 | (2,5-dimethoxy-4-chlorophenyl)–N=N–(1-hydroxy-2,4-disulfonaphthyl) | 2-hydroxybenzaldehyde | H₂NNHC(=O)–phenyl | blue |
| 46 | (1-hydroxy-4-sulfo-2-naphthyl)–N=N–(2-hydroxy-3-sulfo-naphthyl) | 2-hydroxybenzaldehyde | H₂NNHC(=O)–phenyl | greenish blue |
| 47 | (1-hydroxy-4-sulfo-2-naphthyl)–N=N–(2-hydroxy-3-sulfo-naphthyl) | 2-hydroxy-1-naphthaldehyde | H₂NNHC(=O)–phenyl | greenish blue |
| 48 | (1-hydroxy-4-sulfo-2-naphthyl)–N=N–(2-hydroxy-3-sulfo-naphthyl) | 2-hydroxy-1-naphthaldehyde | H₂NNHC(=S)NH₂ | bluish green |

TABLE I-continued

| Example | I | II | III | IV |
|---|---|---|---|---|
| 49 | (2-hydroxy-4-nitro-5-sulfophenyl)azo-2-hydroxynaphthalene | 2-hydroxybenzaldehyde | acetic hydrazide (H₂NNHC(O)CH₃) | violet black |
| 50 | (2-hydroxy-4-nitro-5-sulfophenyl)azo-2-hydroxynaphthalene | 2-hydroxybenzaldehyde | benzoic hydrazide (H₂NNHC(O)C₆H₅) | black |
| 51 | (2,3-dihydroxy-7-nitro-... sulfonaphthyl)azo-hydroxynaphthalene | 2-hydroxybenzaldehyde | formic hydrazide (H₂NNHC(O)H) | black |
| 52 | (2,3-dihydroxy-7-nitro-... sulfonaphthyl)azo-hydroxynaphthalene | 2-hydroxybenzaldehyde | acetic hydrazide (H₂NNHC(O)CH₃) | black |

TABLE I-continued

| Example | I | II | III | IV |
|---------|---|----|-----|-----|
| 53 | (2-hydroxy-3-((2-hydroxynaphthalen-1-yl)azo)-5-nitrobenzenesulfonic acid structure) | salicylaldehyde | benzoic acid hydrazide (H₂NNHC(O)-C₆H₅) | black |
| 54 | (same as 53) | 2-hydroxy-1-naphthaldehyde | benzoic acid hydrazide | black |
| 55 | (same as 53) | 2-hydroxy-1-naphthaldehyde | semicarbazide (H₂NNHC(O)NH₂) | blue black |
| 56 | (same as 53) | 2-hydroxy-1-naphthaldehyde | thiosemicarbazide (H₂NNHC(S)NH₂) | black |

TABLE I-continued

| Example | I | II | III | IV |
|---|---|---|---|---|
| 57 | OH-C6H3(Cl)-N=N-C6H2(OH)(Cl)2 | 3-formyl-4-hydroxy-benzenesulfonic acid | H2NNHCHO | blue |
| 58 | OH-C6H3(NO2)-N=N-C6H2(OH)(Cl)2 | 3-formyl-4-hydroxy-benzenesulfonic acid | H2NNHCHO | greenish blue |
| 59 | OH-C6H3(SO2NH2)-N=N-(2-hydroxy-8-acetamido-naphthyl) | salicylaldehyde | H2NNHCHO | grey |
| 60 | OH-C6H3(SO2NH2)-N=N-(2-hydroxy-8-methoxycarbonylamino-naphthyl) | salicylaldehyde | H2NNHCSNH2 | greenish grey |

TABLE I-continued

| Example | I | II | III | IV |
|---|---|---|---|---|
| 61 | (HO, OH, NO2, HO3S substituted phenyl-N=N-naphthyl with HO) | salicylaldehyde | H2NNHC(=O)-phenyl | olive green |
| 62 | (H2N, OH, Cl, HO3S substituted phenyl-N=N-naphthyl with H2N) | salicylaldehyde | H2NNHC(=O)-phenyl | green |
| 63 | (H2N, OH, NO2 substituted phenyl-N=N-naphthyl-SO3H with H2N) | salicylaldehyde | H2NNHC(=O)NH2 | green |
| 64 | (H2N, OH, NO2 substituted phenyl-N=N-naphthyl-SO3H with H2N) | salicylaldehyde | H2NNHC(=S)NH2 | green |

TABLE I-continued

| Example | I | II | III | IV |
|---|---|---|---|---|
| 65 | H₂N-naphthalene-SO₂NHCH₃ with N=N to OH-phenyl-O₂N | OH-phenyl-C(=O)CH₃ | H₂NNHC(=O)NH₂ | green |
| 66 | H₂N-naphthalene with N=N to OH-phenyl-O₂N | OH-phenyl-C(=O)H-SO₃H | H₂NNHC(=O)CH₃ | green |
| 67 | H₂N-naphthalene with N=N to OH-phenyl-O₂N | OH-phenyl-C(=O)H with N=N-phenyl-SO₃H | H₂NNHC(=O)CH₃ | olive |

TABLE I-continued

| Example | I | II | III | IV |
|---|---|---|---|---|
| 68 | [structure: HO3S, OH, N=N, OH, NO2, CH3, CH3] | [structure: OH, CHO, N=N, SO3H] | [structure: H2NNHC(=O)-phenyl] | yellowish brown |
| 69 | [structure: HO3S, OH, N=N, OH, NO2, CH3, CH3] | [structure: OH, CHO] | [structure: H2NNHC(=O)-phenyl] | brown |
| 70 | [structure: HO3S, OH, N=N, Cl, OH, N, HO, fused ring] | [structure: OH, CHO] | [structure: H2NNHC(=O)-phenyl] | claret |

TABLE I-continued

| Example | I | II | III | IV |
|---|---|---|---|---|
| 71 | (2-hydroxy-4-sulfo-5-nitrophenyl)azo-(hydroxy-methyl)-phenylazobenzene | CH₃—C(=O)—CH₂—C(=O)—CH₃ | H₂NNHC(=O)—C₆H₅ | orange |
| 72 | (2-hydroxy-4-sulfo-5-nitrophenyl)azo-(hydroxy-methyl)-phenylazobenzene | CH₃—C(=O)—CH₂—C(=O)—C₆H₅ | H₂NNHCNH₂ (O=) | reddish orange |
| 73 | (2-hydroxy-4-sulfo-5-chlorophenyl)azo-(hydroxy-methyl)-phenylazobenzene | CH₃—C(OH)(CH₃)—CH₂—C(=O)—CH₃ | H₂NNHCCH₃ (O=) | red |
| 74 | (2-hydroxy-4-sulfonaphthyl)azo-(hydroxy-methyl)-phenylazobenzene | COOC₂H₅—CH₂—C(=O)—CH₃ | H₂NNHC(=O)—C₆H₅ | bluish red |

TABLE I-continued

| Example | I | II | III | IV |
|---|---|---|---|---|
| 75 | [naphthol-azo-pyrazole structure with HO₃S, OH, N=N, CH₃, phenyl] | COOC₂H₅ / CH₂ / C=O / CH₃ | H₂NNHCH=O | pink |
| 76 | [naphthol-azo-pyrazole structure with HO₃S, OH, N=N, CH₃, phenyl] | CH₃—C(=O)—CH₂—C(=O)—NH—phenyl | H₂NNHCCH₃ (O) | pink |
| 77 | [naphthol-azo-pyrazole structure with HO₃S, OH, N=N, CH₃, phenyl] | 2-hydroxy-acetophenone (OH, C(=O)CH₃ on phenyl) | H₂NNHCNH₂ (S) | claret |
| 78 | [naphthol-azo-naphthol structure with HO₃S, OH, N=N] | salicylaldehyde (OH, CHO on phenyl) | 2-hydroxy-benzamide (OH, C(=O)NHNH₂ on phenyl) | blue |

TABLE I-continued

| Example | I | II | III | IV |
|---|---|---|---|---|
| 79 | [naphthalene-azo-naphthalene structure with OH, HO, HO₃S groups] | [phenyl structure with OH, CHO, OH, N groups] | H₂NNHCNH₂ (with O) | greenish blue |
| 80 | [naphthalene-azo-naphthalene structure with OH, HO, HO₃S groups] | CH₃—C(=O)—CH₂—C(=O)—CH₃ | H₂NNHCNH₂ (with S) | greenish blue |
| 81 | [naphthalene structure with SO₂NHCH₃, H₂N, N=N, OH, O₂N groups] | CH₃—C(=O)—CH₂—C(=O)—CH₃ | H₂NNHCCH₃ (with O) | green |
| 82 | [naphthalene structure with SO₂NHCH₃, H₂N, N=N, OH, O₂N groups] | [phenyl structure with CHO, OH groups] | H₂NNHCOC₂H₅ | green |

TABLE I-continued

| Example | I | II | III | IV |
|---|---|---|---|---|
| 83 | [structure: 4-sulfamoylphenol azo-coupled to dichlorohydroxynaphthalene] | [structure: pyridine with CH₃, CHO, OH, and HO substituents] | H₂NNHCH=O | blue |
| 84 | [structure: 4-nitrophenol azo-coupled to aminonaphthalene] | HOOC—CH₂—C(=O)—CH₂—COOH | H₂NNHC(=S)NH₂ | green |

EXAMPLE 85

In accordance with the particulars of French patent specification No. 1 134 264, 43.3 parts of the monoazo dye obtained from diazotised 2-amino-4,6-dinitro-1-hydroxybenzene and 1-aminonaphthalene-4-sulfonic acid are converted into the corresponding 1:1 cobalt complex stabilised by nitrite ligands.

The resultant filter paste is suspended in 600 parts of water of 40°-45° C. After addition of 17.9 parts of 2-hydroxybenzaldehyde semicarbazone, the pH is adjusted to a range of 8.0-9.0 with 2N sodium hydroxide solution and then stirred at the above temperature until the addition of the hydrazone compound to the 1:1 cobalt complex is complete, with removal of the nitrite ligands. A clear, dark green solution is obtained.

The resultant cobalt complex of the following constitution

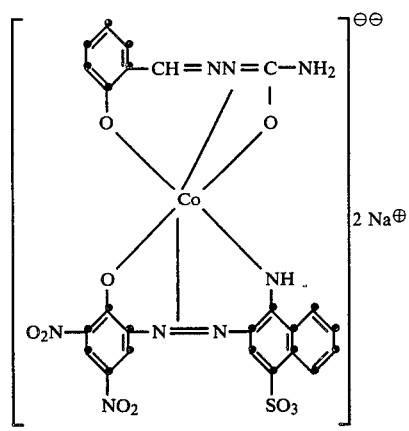

is salted out with sodium chloride and isolated by filtration. The filter cake is washed with a dilute solution of sodium chloride and vacuum dried at 60° C. The novel, readily water-soluble dye produces full, wet- and light-fast dark green shades on polyamide fibres and wool.

Further dyes with similar properties are obtained by reacting the azo dyes in column I of Table II in the form of the 1:1 cobalt complexes, masked as described in this Example, with the hydrazone compounds of the carbonyl compounds listed in column II and the acylhydrazine components listed in column III, in accordance with the particulars of this Example. Column V indicates the shades obtained on wool and polyamide fibres.

TABLE II

| Example | I | II | III | IV |
|---|---|---|---|---|
| 86 | (azo dye structure) | (salicylaldehyde) | H$_2$NNHC(O)CH$_3$ | dark green |
| 87 | (azo dye structure) | (salicylaldehyde) | H$_2$NNHC(O)C$_6$H$_5$ | dark green |
| 88 | (azo dye structure) | (salicylaldehyde) | H$_2$NNHC(S)NH$_2$ | olive green |

TABLE II-continued

| Example | I | II | III | IV |
|---|---|---|---|---|
| 89 | 2,4-dinitro-phenyl-N=N-(1-amino-2-hydroxynaphthalene-sulfonic acid) [OH/NH$_2$, O$_2$N-, NO$_2$, SO$_3$H] | salicylaldehyde | H$_2$NNHCNH$_2$ (with C=O) | dark green |
| 90 | 4-nitro-phenyl-N=N-(1-amino-2-hydroxynaphthalene-sulfonic acid) | salicylaldehyde | H$_2$NNHC(=O)-C$_6$H$_5$ | green |
| 91 | 4-nitro-phenyl-N=N-(1-amino-2-hydroxynaphthalene-sulfonic acid) | salicylaldehyde | H$_2$NNHC(=O)CH$_3$ | green |

DYEING EXAMPLE 1

100 parts of woollen knitting yarn are put into a dyebath comprising 3000 parts of water of 50° C., 5 parts of ammonium sulfate and 1 part of the dye described in Example 1. The temperature of the dyebath is raised to 98° C. over 45 minutes and held for 1 hour. The bath is cooled to 50° C. and the wool is then rinsed and dried. It is dyed in a wet- and lightfast full, yellowish orange shade.

DYEING EXAMPLE 2

100 parts of material made of nylon 6,6 textured fibres are put into a dyebath comprising 3500 parts of water of 50° C., 3 parts of ammonium sulfate and 1 part of the dye of Example 10. The dyebath is heated to the boil over 30 minutes and kept for 1 hour at the boil. The bath is cooled to 50° C. and the material is rinsed and dried, affording a scarlet substrate with very good wetfastness properties and excellent lightfastness.

DYEING EXAMPLE 3

1000 parts of nylon 6,6 textured fabric are put at 50° C. into a dyebath which contains 3000 parts of completely demineralised water, 2 parts of the chromium complex of Example 44, 3 parts of ammonium acetate and sufficient 40% acetic acid to adjust the pH to 5. The dyebath is heated to the boil over 30–40 minutes and dyeing is carried out for 1 hour at the boil. The bath is cooled to 50° C. and the polyamide fabric is thoroughly rinsed and dried. A level, wet- and lightfast blue dyeing is obtained.

DYEING EXAMPLE 4

100 parts of prewetted textured polyamide (nylon 6,6) are put into a dyebath which contains 4000 parts of water, 2 parts of the dye of Example 65 and 3 parts of ammonium sulfate. The dyebath is heated to the boil over 45 minutes and kept at this temperature for a further 60 minutes. The goods are then rinsed and dried. The polyamide fabric is dyed in a wet- and lightfast green shade.

What is claimed is:

1. A chromium or cobalt complex of the formula

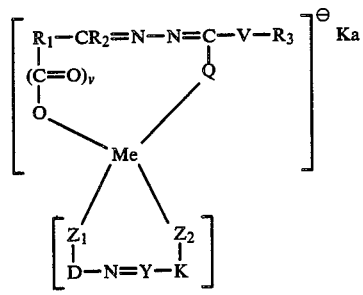

wherein:
D is the radical of a benzene, napthalene or heterocyclic diazo component;
Y is nitrogen or —CH;
K is the radical of a coupling component if Y is nitrogen, or an o-hydroxyaldehyde radical if Y is —CH:
Ka is a cation;
Me is chromium or cobalt;

$Z_1$ is —O— or —COO— ortho to N=Y $Z_2$ is —O— or —NR vicinal to N=Y, wherein R is hydrogen, or a $C_1$-$C_4$alkyl or phenyl radical;

$R_1$ is a direct bond or a $C_1$-$C_8$-alkyl, $C_1$-$C_8$-alkenyl, or aryl radical or heterocyclic radical containing 1 to 3 sulfur, oxygen or nitrogen atoms;

$R_2$ is hydrogen or a $C_1$-$C_8$-alkyl or aryl radical;

$R_3$ is hydrogen or a $C_1$-$C_8$alkyl, aryl or amino radical, or a heterocyclic radical containing to 1 to 3 sulfur, oxygen or nitrogen atoms;

V is a direct bond or oxygen;

Q is oxygen or sulfur; and w is 0 or 1.

2. A complex according to claim 1 which contains at least one water-solubilizing group.

3. A complex according to claim 2 wherein said solubilizing group is a sulfonic acid group.

4. A chromium or cobalt complex according to claim 1 of the formula

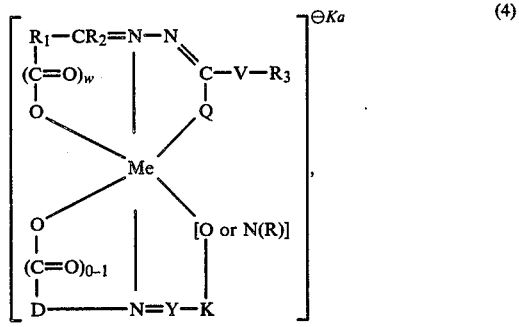
(4)

wherein $R_1$ is a direct bond, an unsubstituted or carboxy-substituted $C_1$-$C_8$alkyl radical, a $C_1$-$C_8$alkenyl radical, which is unsubstituted or substituted by phenyl or phenylamino, or a phenyl or naphthyl radical, each unsubstituted or substituted by $C_1$-$C_4$alkyl, halogen, nitro, $C_2$-$C_4$alkanoylamino, sulfo, carboxy or arylazo, or pyridyl or quinolinyl radical, each substituted by hydroxy or $C_1$-$C_4$alkyl; $R_2$ is hydrogen, an unsubstituted or carboxy-substituted $C_1$-$C_8$alkyl or is a phenyl or naphthyl radical, each unsubstituted or substituted by $C_1$-$C_4$alkyl, halogen, nitro, $C_2$-$C_4$alkanoylamino, sulfo or carboxy; $R_3$ is hydrogen, $C_1$-$C_8$alkyl, $C_1$-$C_4$phenylalkyl, $C_1$-$C_4$naphthylalkyl or phenyl or naphthyl, each unsubstituted or substituted by halogen, nitro or hydroxy or is a radical of the formula

wherein $R_4$ and $R_5$ are each independently of the other hydrogen or a $C_1$-$C_8$alkyl or phenyl radical; D is the radical of a diazo component containing the —(CO)$_{0-1}$—O—group in the ortho position to —N=Y—; K, if Y is a nitrogen atom, is the radical of a coupling component of benzene, naphthalene, 5-pyrazolone, 5-aminopyrazole, quinoline substituted by hydroxy, acetoacetarylide or benzoylacetarylide, which radical contains the —O or N(R)— radical vicinal to the azo group, and R is hydrogen or a $C_1$-$C_4$alkyl or phenyl radical or, if Y is the —CH— group, K is the radical of an o-hydroxybenzaldehyde or o-hydroxynaphthaldehyde.

5. A complex according to claim 4 wherein:

$R_1$ is phenyl or naphthyl, each unsubstituted or substituted by $C_1$-$C_4$alkyl, halogen, nitro, acetylamino, sulfo, phenylazo, or sulfophenylazo, or is pyridyl or quinolinyl each substituted by hydroxy or $C_1$-$C_4$alkyl; $R_2$ is hydrogen or $C_1$-$C_4$alkyl; w is 0; and $R_3$ is hydrogen, amino, $C_1$-$C_4$alkyl, or phenyl which is unsubstituted or substituted by $C_1$-$C_4$alkyl, halogen, hydroxy or nitro; or $R_1$ is a direct bond; $R_2$ is hydrogen, $C_1$-$C_4$alkyl or phenyl; w is 1; Q is an oxygen atom; and $R_3$ is hydrogen, amino, $C_1$-$C_4$-alkyl or phenyl which is unsubstituted or substituted by $C_1$-$C_4$-alkyl, hydroxy, halogen or nitro; or $R_1$ is unsubstituted or carboxy-substituted $C_1$-$C_4$-alkyl; $R_2$ is hydrogen or unsubstituted or carboxy-substituted $C_1$-$C_4$-alkyl; Q is an oxygen atom; and $R_3$ is hydrogen, amino $C_1$-$C_4$-alkyl or phenyl which is unsubstituted or substituted by $C_1$-$C_4$-alkyl, hydroxy, halogen or nitro; or $R_1$ is $C_2$-$C_6$-alkenyl which is unsubstituted or substituted by phenyl or phenylamino; $R_2$ and $R_3$ are each independently of the other hydrogen, $C_1$-$C_4$-alkyl or phenyl which is unsubstituted or substituted by $C_1$-$C_4$-alkyl, halogen, hydroxy or nitro; or $R_3$ is amino; w is 0 and Q is an oxygen atom.

6. A chromium or cobalt complex according to claim 5 of the formula

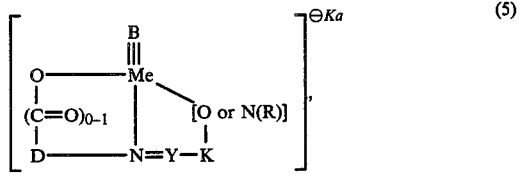
(5)

wherein B is the radical of the formula

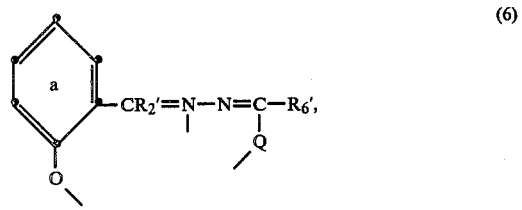
(6)

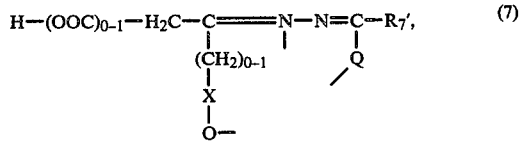
(7)

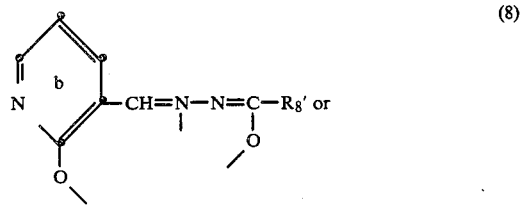
(8)

-continued

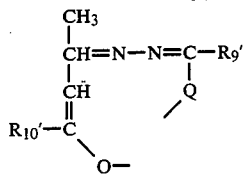
(9)

wherein $R_2'$ is hydrogen or methyl, $R_6'$ is hydrogen, methyl, ethoxy, ethyl, $-NH_2$, phenyl or phenyl which is substituted by chlorine, nitro or hydroxy, $R_7'$ is amino, methyl or phenyl, $R_8'$ is hydrogen or amino, $R_9'$ is amino, methyl or phenyl, $R_{10}'$ is methyl, phenyl or phenylamino, Q is an oxygen or sulfur atom, X is carbonyl or isopropyl, and the phenyl ring (a) in formula (6) is unsubstituted or substituted by chlorine, sulfo, phenylazo or sulfophenylazo or by a fused benzene ring, and wherein the pyridyl ring (b) is unsubstituted or substituted by hydroxy, methyl or a fused benzene ring, and D is a benzene nucleus which contains the $-(C=O)_{0-1}O$ group ortho to the $-N=Y-$ group and is unsubstituted or substituted by sulfo, sulfamoyl, chlorine, nitro and/or methoxy groups, or is a naphthalene nucleus which contains the $-(C=O)_{0-1}O$ group ortho to the $-N=Y-$ group and is unsubstituted or substituted by sulfo or nitro, Y is a nitrogen atom or the $-CH-$ group, K, if Y is a nitrogen atom, is a naphthalene nucleus which contains the $[-O-$ or $-N(R)-]$ group ortho to the azo group and is unsubstituted or substituted by sulfo, N-methylsulfamoyl, acetylamino, methoxycarbonylamino or chlorine, a 1-phenyl-3-methyl-5-pyrazolone radical which is unsubstituted or substituted in the phenyl ring by chlorine or sulfo, or is a dimethylphenyl radical, a 2-hydroxyquinolinyl radical or an acetoacetanilide radical, which last three mentioned radicals are attached to the metal atom Me through an oxygen atom ortho to the azo group, R is hydrogen or phenyl or, if Y is the $-CH-$ group, K is the radical of 2-hydroxybenzaldehyde, Ka is an alkali metal cation and Me is a chromium or cobalt atom.

7. A chromium or cobalt complex according to claim 1, wherein Me is a chromium atom.

8. A chromium complex according to claim 1, wherein Y is a nitrogen atom.

9. A chromium or cobalt complex according to claim 6, wherein B is a radical of the formula

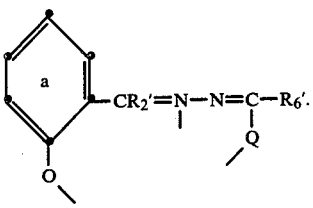

10. A chromium complex according to claim 6, wherein K is naphthalene nucleus which is attached to the chromium atom through an oxygen atom, Y is a nitrogen atom and the naphthalene nucleus is unsubstituted or substituted by sulfo, N-methylsulfamoyl, acetylamino, methoxy carbonylamino or chlorine.

* * * * *